United States Patent [19]

Tanaka et al.

[11] Patent Number: 5,467,411
[45] Date of Patent: Nov. 14, 1995

[54] SYSTEM WITH APPROXIMATION MECHANISM FOR RECOGNIZING GRAPHICAL ELEMENTS IN A DRAWING

[75] Inventors: Satoshi Tanaka; Hideaki Maehara, both of Kanagawa, Japan

[73] Assignee: Mitsubishi Denki Kabushiki Kaisha, Tokyo, Japan

[21] Appl. No.: 951,745

[22] Filed: Sep. 25, 1992

[30] Foreign Application Priority Data

Sep. 26, 1991 [JP] Japan .................. 3-247700

[51] Int. Cl.$^6$ .................................. G06K 9/62
[52] U.S. Cl. .................. 382/113; 382/170; 382/190
[58] Field of Search .................. 382/1, 10, 16, 382/23, 24, 25, 18, 113, 170, 190, 201, 202, 203; 395/147, 155, 919, 921

[56] References Cited

U.S. PATENT DOCUMENTS

| | | | |
|---|---|---|---|
| 4,075,604 | 2/1978 | Degasperi | 340/146.3 AG |
| 4,167,729 | 9/1979 | Christenson et al. | 340/146.3 AH |
| 4,567,610 | 1/1986 | McConnell | 382/18 |
| 4,949,388 | 8/1990 | Bhaskaran | 382/10 |
| 5,012,521 | 4/1991 | Endo et al. | 382/1 |
| 5,068,804 | 11/1991 | Watanabe et al. | 395/147 |
| 5,101,436 | 3/1992 | DeAguiar et al. | 382/1 |
| 5,144,566 | 9/1992 | Anderson et al. | 364/552 |
| 5,291,561 | 3/1994 | Janaka et al. | 382/8 |

FOREIGN PATENT DOCUMENTS

| | | | |
|---|---|---|---|
| 0117336 | 9/1984 | European Pat. Off. | 382/10 |
| 60-72087 | 4/1985 | Japan | 382/18 |
| 62-192887 | 8/1987 | Japan | 382/18 |
| 63-44278 | 2/1988 | Japan | G06F 15/60 |
| 1-79870 | 3/1989 | Japan | G06F 15/60 |

OTHER PUBLICATIONS

Bishop et al., "Character Recognition Approach Involving Histogram Classification," *IBM Technical Disclosure Bulletin*, vol. 21, No. 9, Feb. 1979, pp. 3461–3467.

Suzuki et al., "Maris: Map Recognition Input System," *Pattern Recognition*, vol. 23, No. 8, 1990, pp. 919–933.

Nagao et al., "An Automatic Road Vector Extraction Method From Maps," 9th Int. Conf. on Pattern Recognition, 1988, pp. 585–587.

"Interactive Drawing Input System", Nikkei Computer Graphics, pp. 120–130, Apr., 1987.

*Primary Examiner*—Leo H. Boudreau
*Assistant Examiner*—Andrew W. Johns
*Attorney, Agent, or Firm*—Wolf, Greenfield & Sacks

[57] ABSTRACT

A drawing recognition system is disclosed which recognizes even a complex low-quality drawing containing overlapping charts, or many blurs or discontinuations with less operations. The system includes both a program for approximating a graphical object to be recognized and a program for approximating positions on the approximated graphical object. The system further includes a means for creating a chart model according to the designation, and a chart recognition means for matching the chart model and the chart to be recognized in the drawing.

30 Claims, 19 Drawing Sheets

Fig. 8a

| Fig. 8 |
|---|
| Fig. 8a |
| Fig. 8b |

```
        START
          │
          ▼
┌─────────────────────────────────┐
│ CREATE ROUGH SKETCH ON LINES    │ ─── 31
│ AB, BC ON THE BASIS OF THE      │
│ APPROXIMATE SHAPE OF DESIGNATED │
│ CHART                           │
└─────────────────────────────────┘
          │
          ▼
┌─────────────────────────────────┐
│ FOR EACH OF LINES OF ROUGH      │ ◄──┐
│ SKETCH (e.g., FOR LINE AB)      │    │
└─────────────────────────────────┘    │
          │                            │
          ▼                            │
┌─────────────────────────────────┐    │
│ DIVIDE LINE AB OF ROUGH SKETCH  │ ─── 32
│ BY (N-1) TO FORM EQUISPACED     │    │
│ POINTS ($A=A_1, A_2, \ldots, A_N=B$) AND ASSOCIATE │
│ THEM WITH CLOSEST BLACK POINTS  │    │
│ IN THE DRAWING THEREBY ALTERING │    │
│ POSITIONS OF POINTS $A_1$ TO $A_N$ │    │
└─────────────────────────────────┘    │
          │                            │
          ▼                            │
┌─────────────────────────────────┐    │
│ DETERMINE GROUP OF SEQUENCES    │ ─── 33
│ OF THE SAME DIRECTION AS        │    │
│ CORRECT INTERVAL AND DETERMINE  │    │
│ GROUP OF SEQUENCES OF DIFFERENT │    │
│ DIRECTION AS INCORRECT INTERVAL,│    │
│ OUT OF SEQUENCES OF LINES       │    │
│ CONNECTING TWO ADJACENT POINTS  │    │
│ $A_1 A_2, A_2 A_3, \ldots$      │    │
└─────────────────────────────────┘    │
          │                            │
          └────────────────────────────┘
```

Fig. 23d
{
文 SCHOOL
〒 POST OFFICE
● ELECTRICAL POWER POLE
}

SYSTEM WITH APPROXIMATION MECHANISM FOR RECOGNIZING GRAPHICAL ELEMENTS IN A DRAWING

BACKGROUND OF THE INVENTION

1. Field of the Invention

The present invention relates generally to image processing systems and, more particularly, to systems for recognizing graphical objects in drawings, such as for generating drawing databases.

2. Description of the Related Art

A conventional system for recognizing graphical objects in a drawing is discussed in "Interactive Drawing Input System," *Nikkei CG*, pages 120–130, April 1987, which is hereby incorporated by reference. This system relies on a line tracking recognition strategy.

The configuration of this conventional system is shown in FIG. 1. The drawing recognition system comprises an image reader 11, a video display 12, an input device 13, a data processing system 14, having a memory 14a and a processor 14b, and a drawing plotter 15. The data processing system 14 executes a drawing recognition program 65 for recognizing graphical objects in an image that has been read by the image reader 11. The major components of the drawing recognition program 65 are shown in FIG. 2. The drawing recognition program 14 comprises a tracking start point determination program 66, a line tracking program 67, and a tracking candidate determination program 68.

The operation of the conventional system will now be described with reference to an example shown in FIGS. 3a–3d. First, a drawing is digitized by the image reader 11 to produce digital image data, and the data is fed to the data processing system 14. In this context, a "drawing" is any printed image on a suitable physical medium, such as paper. Digital image data is represented as an x-y coordinate grid of pixels represented by binary values. The digital image data is then displayed on the video display 12 so that an operator may view the image that has been read.

The operator then uses the input device 13, which may be a mouse or tablet, to designate a type of a chart to be recognized, by selecting the type from a pre-programmed menu list. For example, the list may include a number of patterns which may be recognized such as polygons, lines of different thicknesses, circles and arcs, etc.

Examples of types of charts to be recognized are shown in FIG. 23a–23d. A simple chart (FIG. 23a) is a line of constant width and indefinite length, which may be solid, broken or a chain. In an equipment drawing, a simple chart may represent an electrical power line, for example.

A compound chart is a combination of simple charts, which in an equipment drawing may represent equipment. Three examples are shown in FIG. 23b.

A graphic pattern is a pattern illustrating configurations of objects. On a map, a graphic pattern may represent roads and houses (see FIG. 23c).

Symbols are marks of constant size which indicate specific objects. On a map a symbol may represent, for example, a school or post office. On equipment drawings it may represent, for example, an electric power pole (see FIG. 23d). In the present example, assume that the operator selects a "polygon" with the input device 13 (FIG. 1) as the type of chart to be recognized.

Having specified the chart type, the operator specifies a tracking start point Q, for the graphical object 70 (FIG. 3a) to be recognized, in response to a tracking start position determination program 66 (FIG. 2). The position Q is identified by using the input device 13 (FIG. 1) to move a cursor on the video display 12 to the desired position on the displayed image. Point Q, known as the tracking start position, is the point at which tracking of the graphical object 70 begins.

Often, the point Q designated by an operator is not located on the chart to be recognized. Thus, the tracking start position determination program prompts the user to select another point Q on the chart until the actual selected point Q is on the chart. In this and other CAD systems, the requirement that a designated point Q must be on a line in the image results in fatigue and annoyance of the operator.

Once the tracking start position Q is designated, a line tracking program 67 (FIG. 2) is executed to begin tracking a line in any direction on the object 70 (FIG. 3a) from the tracking start point Q.

Tracking of a line is performed on the basis that, for each line, a function can be determined to define the line in terms of y=ax+b, where a is the slope of the line and b is an offset. Also, a thickness can be determined. Similarly, the radius of curvature defines arcs and circles. Tracking of a line is performed by incrementing x, determining y, and determining if image data is found at the newly determined x,y coordinates, with the desired line thickness. When there is no more data in a given direction, tracking in that direction stops, and a new direction is determined.

In the example of FIG. 3a, the tracking progresses in the direction of the arrow X (FIG. 3a) as indicated by the shaded region 72 in FIG. 3b. When branch point T is reached, tracking continues in the same direction, as it is possible to continue. At the corner C, the direction of tracking is changed. When branch point K is reached (FIG. 3C), a decision must be made as to whether tracking should continue in direction "R" or whether alternatively to proceed along line "S". This determination is made by the operator based upon the type of graphical object that is to be recognized. That is, the shape of the object to be recognized can suggest the proper changes in tracking direction. In this instance, branching should be carried out nearly orthogonally. That is, tracking should continue in the rectilinear direction, the direction "R", in which the tracking of the object 70 is optimized.

When it is not clear which tracking direction should be selected, a tracking candidate determination program 68 (FIG. 2) presents multiple tracking candidates to the operator in descending order of probability and requests the operator to designate a candidate. In FIG. 3c, tracking directions R and S are presented as candidates. In response to these candidates, the operator manipulates the input device 13 (FIG. 1) to select the correct tracking direction R. Then, the line tracking program 67 (FIG. 2) resumes tracking.

When the line tracking program 67 (FIG. 2) completes tracking a line of an intended graphic (i.e., the tracking is completed around the graphical 70), the system has a complete recognized graphical object. In the example case at FIG. 3d, the tracking has returned to the tracking start point Q. For objects which are not closed, tracking terminates when the object has been recognized or when no more image data remains to be traced. At this point, the system recognizes that the graphical object 70 is a "polygon" and tracking is terminated.

The above described steps are repeated for each of the graphical objects in the drawing. The steps are repeated until all of the graphical objects have been recognized.

In order to recognize a chart in a drawing containing overlapping graphics, an operator of the conventional system must designate which line is tracked at every point at which the currently tracked line overlaps another graphic and the direction of tracking needs to be changed. Thus, the operator is forced to carry out a number of complicated operations. Furthermore, if a drawing contains a dashed line or a dot-dash line which overlaps another graphic or has deteriorated due to frequent copying so that lines discontinue or blur, a conventional drawing recognition system fails to track a line and extract an object graphic. Likewise, when a graphical object is made of multiple charts (hereafter referred to as a "compound chart") each line must be designated in order for the compound chart to be recognized. This increases an operator's work load and may also result in the failure to track a line due to a discontinuation in the line.

Moreover, when symbols are appended to a chart or a compound chart, the operator must designate the chart and symbols separately. When the drawing contains isolated symbols or a row of characters exist in an area where various graphic elements are arranged densely, entry of such isolated symbols or text string requires the operator to designate positions, inclinations and types of such symbols or characters.

Furthermore, recognition of a graphic in the drawing is done in such a manner that the operator appoints graphics one-by-one so that appointment of another graphic for recognition cannot be done until the result of recognition of the preceding graphic is obtained. Moreover, such a conventional drawing recognition system cannot separate image data of a recognized graphical object from a background or a sketch. Therefore, unless all data has been recognized, the background or sketch cannot be combined with the recognized graphic. This restricts the applications of recognized data.

SUMMARY OF THE INVENTION

The object of the present invention is to solve the aforesaid problems or to provide a drawing recognition system capable of recognizing the type, shape, precise position of a graphic forming a line or compound graphic in a drawing which contains overlapping graphics or has deteriorated because of frequent copying, and then separating the recognized graphic from the background or sketch, when an operator designates an approximate type of graphic and its approximate position.

Another object of the invention is to provide a drawing recognition system for recognizing the type and precise position of a symbol accompanying a line or compound line simultaneously with a chart or compound chart, and then separating a recognized graphic from a background or a sketch.

It is also an object of the present invention to provide a drawing recognition system in which even isolated symbols or characters in the drawing can be recognized in terms of their types, positions and inclinations, by a rough indication of approximate positions of such symbols or characters.

It is also an object of the present invention to provide a drawing recognition system in which, when approximate positions of graphical objects are consecutively designated, such graphical objects are recognized in accordance with such position information.

A drawing recognition system in accordance with the present invention comprises an approximate graphic designating means for designation an approximate type of an intended graphic in a drawing, an approximate position designating means for designating an approximate position and shape of the intended graphic in the drawing, a chart model creating means for creating a chart model for use in recognizing the graphic in the drawing in response to the designated approximate type and position, and a chart recognizing means for matching the data of the drawing to be recognized and the chart model to recognize the graphic.

The chart recognizing means may include a simple chart recognizing means which corrects a chart model forming a straight line or a dashed line according to the image data of a recognition graphic in a drawing, and then recognizing the type, shape, and position of the line by using the corrected chart model.

The chart recognizing means also may include a symbol recognizing means which recognizes the type, shape, and precise position of a symbol connected to a line or a compound line according to the characteristic of the image data of an area in the vicinity of the approximate position.

The chart recognizing means also may include a compound chart recognizing means which extracts the contour lines of a compound chart by using the chart model made up of a combination of lines, the image data in a drawing, and the designated approximate position, and then recognizing the type, shape, and precise position of the compound chart.

The chart recognizing means may include an isolated symbol recognition means which extracts the image data constituting the isolated symbol, on the basis of the designated approximate position, as well as approximate classification of the symbol and the image data obtained from the drawing. The isolated symbol recognition means then recognizes the type, slope or rotation information and exact position of the isolated symbol on the basis of the extracted image data.

The chart recognition means may include a text string recognition means which extracts image data constituting a text string, on the basis of the image data in the drawing, and the designated approximate position as well as with the knowledge that the object to be recognized is characters. The text string recognition means then recognizes, on the basis of the extracted image data, the type, size and slope or rotation information of the text string.

An approximate chart designating means allows an operator to designate an approximate type of an intended graphic. An approximate position designating means allows the operator to designate an approximate position and shape of the graphic to be recognized in the drawing. A chart model creating means creates a chart model used for recognition according to the approximate type, position, and shape of the graphic, which the operator enters. A chart recognizing means matches the chart model and the image data of the graphic to be recognized, and thus recognizes the type, position, and shape of the chart in the drawing. Thereby, even a graphic to be recognized residing in a complex drawing containing overlapping graphics or in a drawing which has deteriorated due to frequent copying, a portion of the graphic which an operator designates can be extracted, recognized, and then entered in a computer.

A simple chart recognizing means matches the chart model and the linear image data in the vicinity in accordance with the positional relationship between the image data in a drawing and the chart model, and then recognizes the type, shape, and position of a designated chart. Therefore, not only a straight line but also a chart formed with a dashed line or a dot-dash line can be recognized in a complex drawing containing overlapping graphics. Moreover, the shape of a line can be faithfully approximated, and the recognized shape of a line can be trimmed.

When a pattern or a graphic constituting a symbol exists on the chart or on the compound chart, the type and position of the symbol connected to the chart or the compound chart can be recognized simply by designation of the symbol position through the approximate position designating means. Therefore, the burden on the operator is greatly relieved because of elimination of the work for separate designation of the chart and symbols and the work for synthesizing the data concerning such chart and symbols.

A compound chart recognizing means extracts the contour lines of the image data forming a compound chart according to the positional relationship between the image data in a drawing and the chart model, and then recognizes the data inside the contour lines to identify the type of graphic. Therefore, an operator need not designate charts one by one but fetches a compound chart as a unit.

The isolated symbol recognizing means picks up image data of the area in the vicinity of the designated approximate position, so that the operator need not exactly designate the slope or rotation information and position of the symbol.

The text string recognizing means picks up image of area in the vicinity of the designated approximate position and recognizes the text string by separating the image constituting the text string, so that the operator need not exactly designate the position, slope or rotation information and the size of the text string.

The approximate position designating means can designate approximate position of each object to be recognized. In addition, the approximate position indicating means can consecutively designate approximate positions of a plurality of objects and produce the results of the recognition of such objects. It is therefore possible to enter the drawing information to a computer in a short time.

By having an approximate graphic designating means, an approximate position designating means, a chart model creating means, and a chart recognizing means, a drawing recognition system can recognize a drawing which contains overlapping charts, or which has deteriorated because of frequent copy, or which contains a graphic with many discontinuations.

The incorporation of a simple chart recognizing means permits recognition of not only a straight line but also a dashed or dot-dash line overlapping another graphic.

The incorporation of a symbol recognizing means permits recognition of symbols connected to a chart with less operations.

The incorporation of a compound chart recognizing means permits recognition of a compound chart made up of multiple lines and overlapping other graphic with less operations.

The preferred embodiment of the invention also provides an advantage in that any isolated symbol in the drawing can be recognized with reduced operations by virtue of the provision of the isolated symbol recognition means.

The preferred embodiment of the invention also provides an advantage in that any text string in the drawing can be recognized with a reduced operation, by virtue of the provision of the text string recognition means.

The preferred embodiment of the invention further provides an advantage in that it can consecutively recognize a plurality of objects in the drawing, thus enabling recognition of the drawing in a very short time, by virtue of the provision of the approximate position indicating means.

BRIEF DESCRIPTION OF THE DRAWING

The foregoing and other objects, features and advantages of the invention will be more completely understood in view of the following detailed description of a preferred embodiment, when read in conjunction with the attached drawing, in which:

FIG. 23a–23d are examples of types of charts; and

DETAILED DESCRIPTION OF THE PREFERRED EMBODIMENT

A first embodiment of the present invention will now be described in conjunction with the drawings. The illustrative embodiment utilizes the same hardware as employed in the conventional system of FIG. 1. The machine preferably used is an engineering work station using the UNIX operating system. A suitable programming language for implementing the invention on such a workstation is the C programming language. The illustrative embodiment differs from the conventional system primarily in how it is programmed. It should be understood by those skilled in the art that the invention is not limited to the machine and programming language used. Specific special-purpose hardware could be constructed to implement the invention. Further, other computers and programming languages could also be used.

Figure 4:
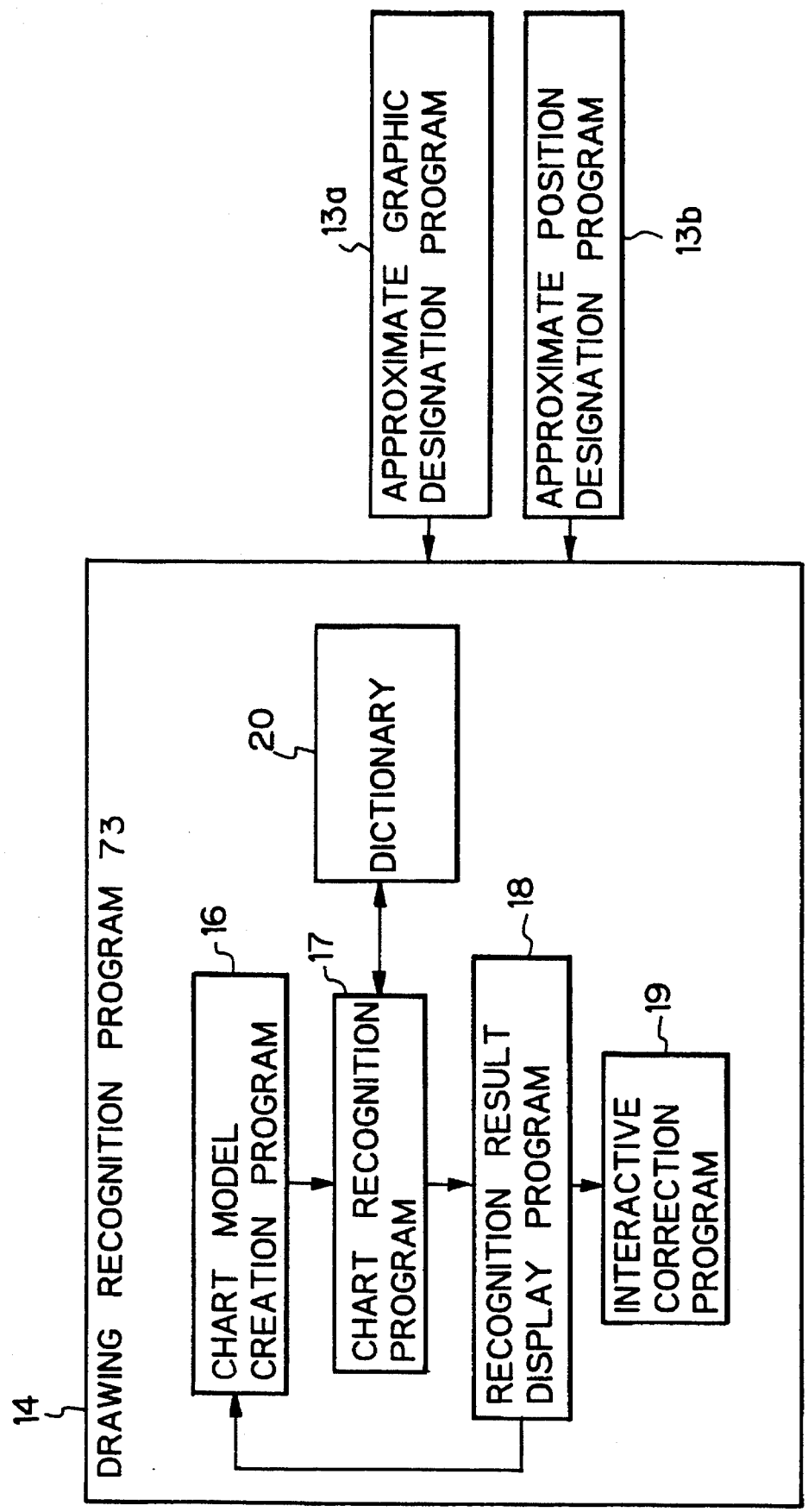
FIG. 4 is a block diagram showing the configuration of programs used in a drawing recognition system in accordance with an embodiment of the present invention.

The major components of the program for the drawing recognition system of the preferred embodiment are shown in FIG. 4. The system includes an approximate graphic designation program 13a which allows the operator to designate an approximate type of graphical object to be recognized, and an approximate position designation program 13b which allows the operator to designate an approximate position and shape of the graphical object to be recognized in the drawing.

Figure 1:
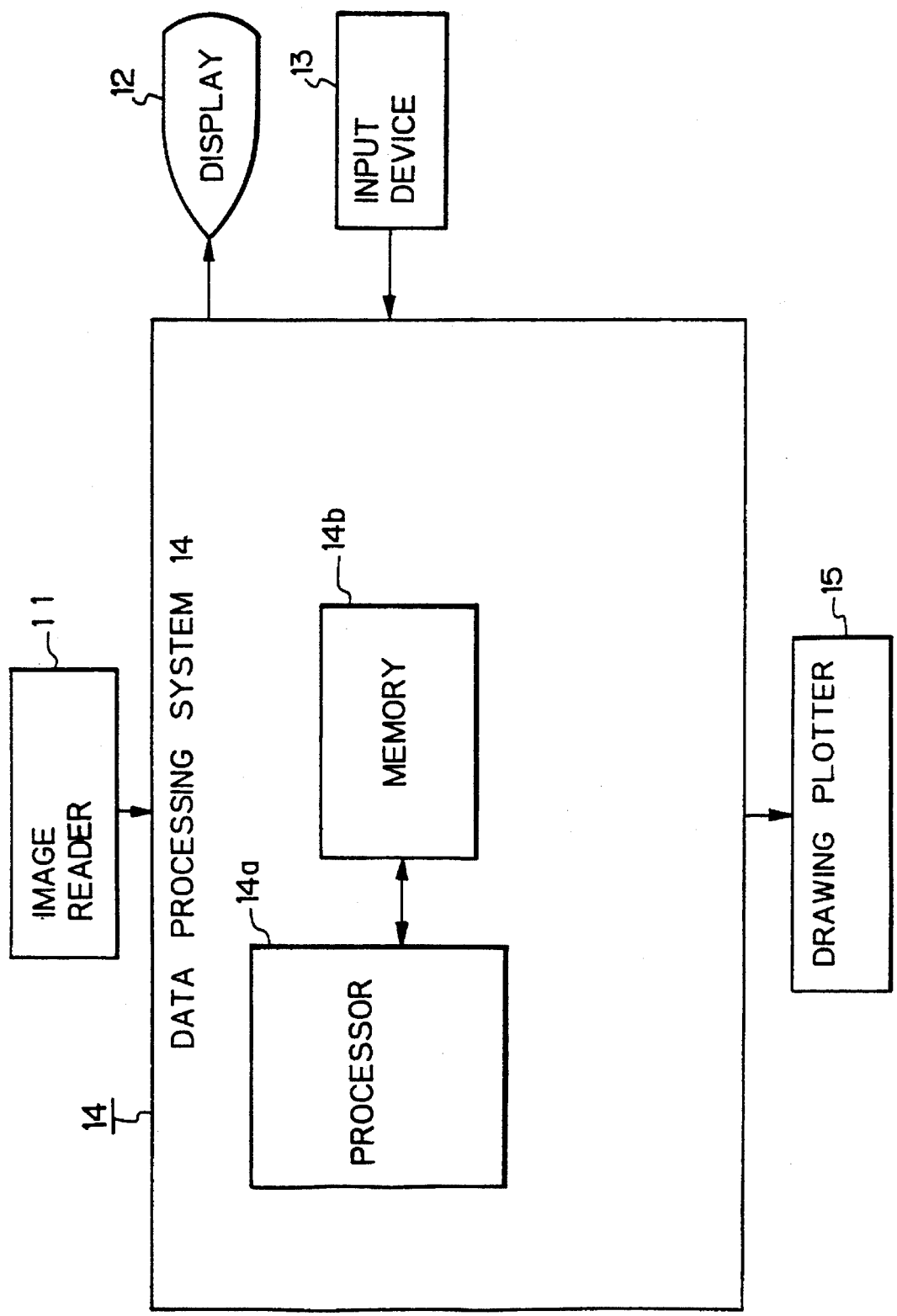
FIG. 1 is a block diagram showing the configuration of a conventional drawing recognition system.
Figure 2:
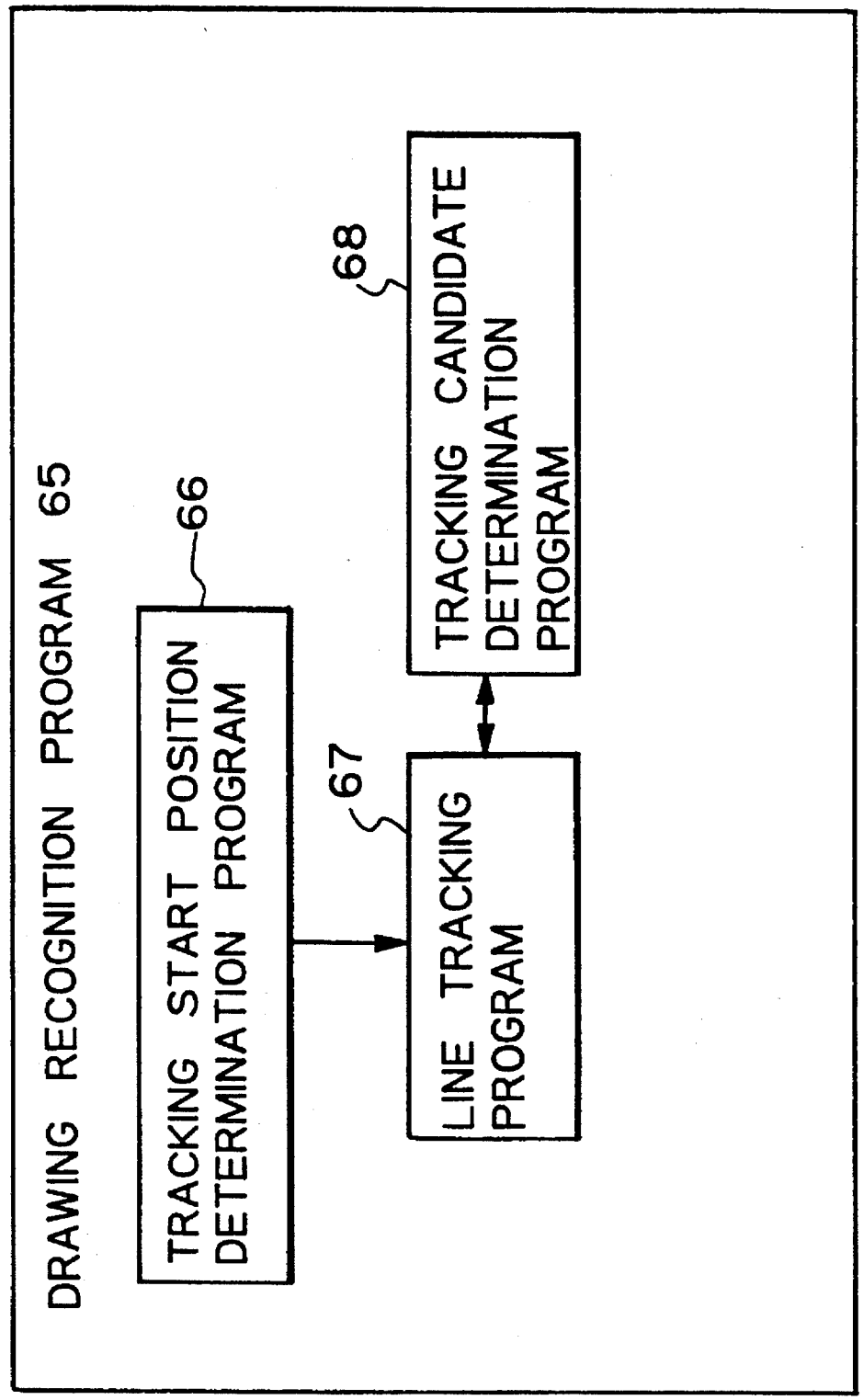
FIG. 2 is a block diagram of a conventional drawing recognition program that is run on the data processing system 14 of FIG. 1.
Figure 3A:
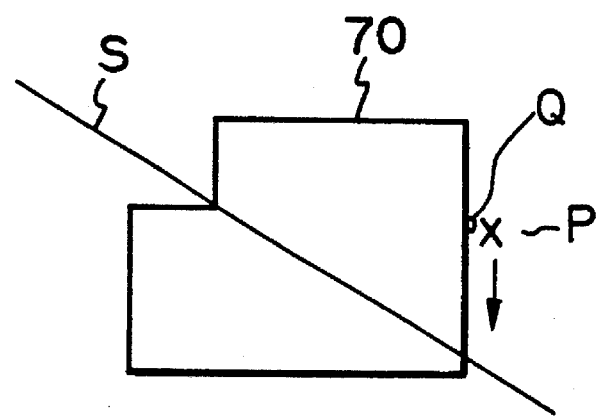
FIGS. 3a–3d are diagrams illustrating the operation of the conventional drawing recognition system of FIG. 1.
Figure 3B:
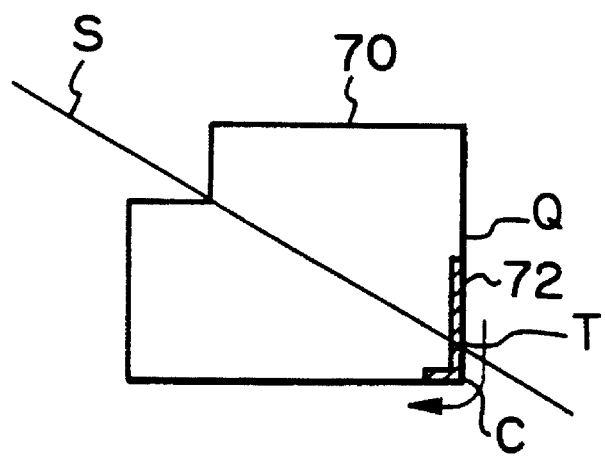
Figure 3C:
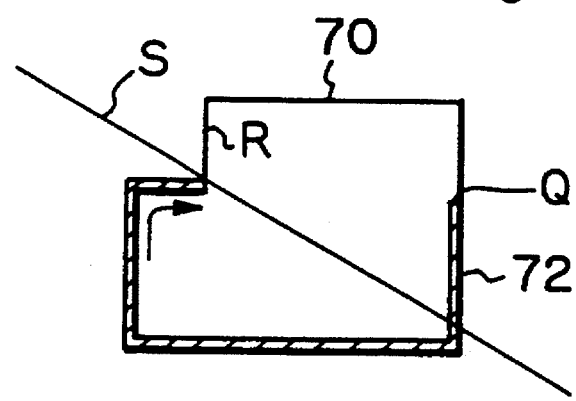
Figure 3D:
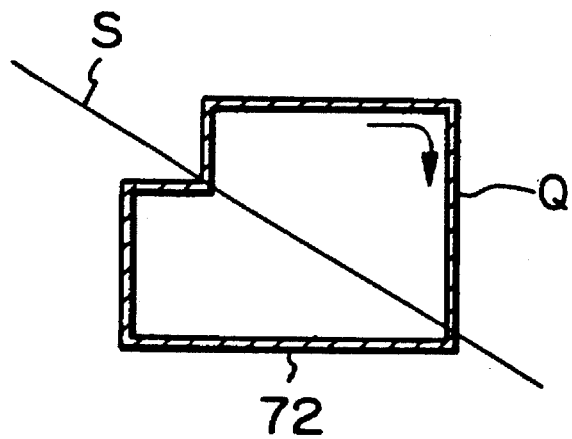

The system further includes a drawing recognition program 73 for recognizing graphical objects in the input drawing. The drawing recognition program is made from several other programs and components: a chart model creation program 16, a chart recognition program 17, a dictionary 20, a recognition result display program 18, and an interactive correction program 19. The chart model creation program 16 is used for creating a chart model (i.e., a rough sketch of a graphical object) for use in recognizing the graphical object according to the approximate type of object and its approximate position (which the operator designates). The chart recognition program 17 matches image data of the drawing with the rough sketch created by chart model creating program 16. The recognition dictionary 20 stores characteristics about objects for use in recognizing objects, such as normalized histograms of ideally-drawn symbols. The recognition result display program 18 superimposes on the video display 12 (FIG. 2) a recognition result over the input image data. The interactive correction program 19 corrects the recognition result or separates the recognized object from the image data of the input drawing to produce a background. The processes of the aforesaid components are executed by the data processing system 14 (FIG. 1). Each of these components will be described in more detail below.

Figure 5:
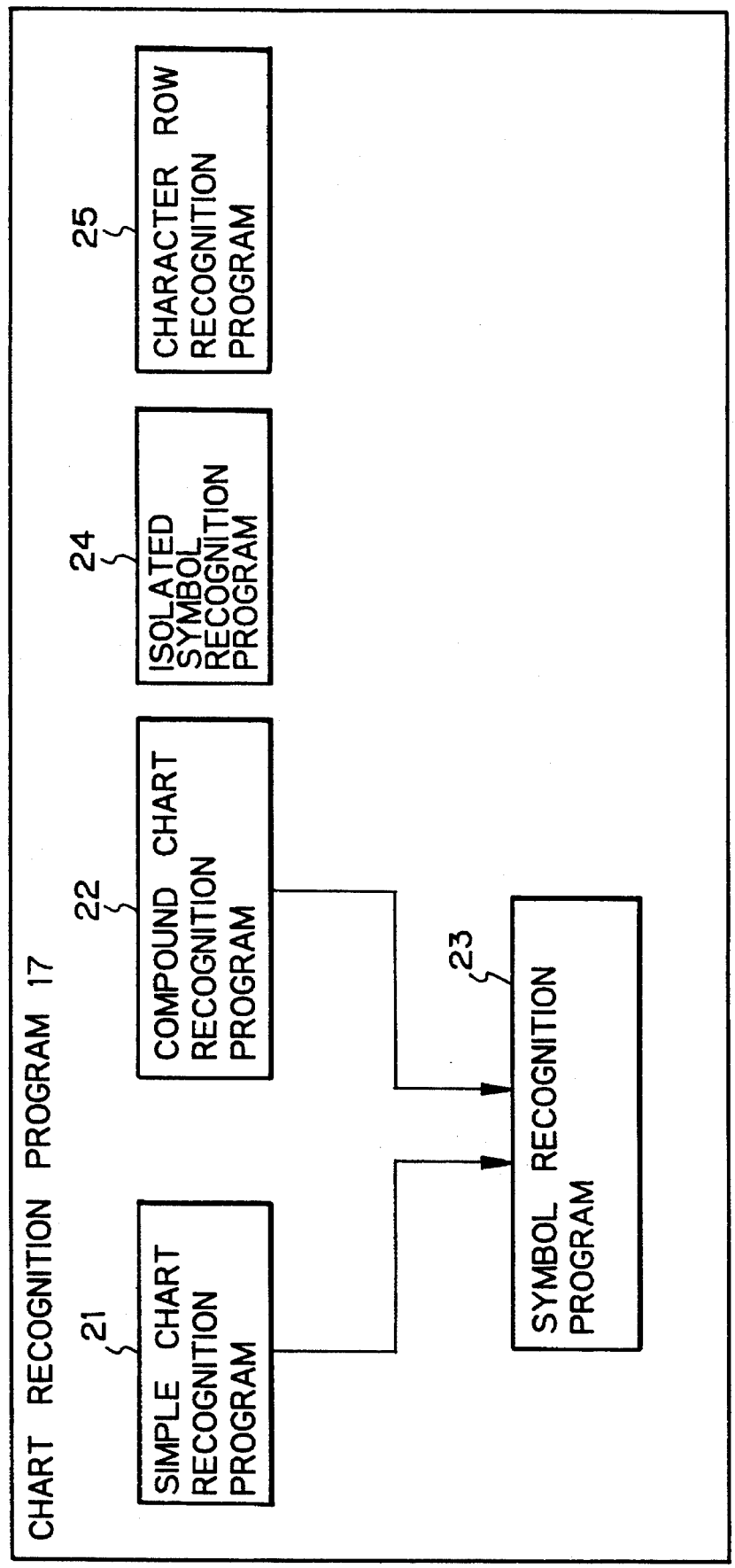
FIG. 5 is a block diagram showing the chart recognition program of FIG. 4 in more detail.

FIG. 5 is a block diagram of the chart recognition program 17. The chart recognition program includes a simple chart recognition program 21 for recognizing charts formed by a simple line, such as a straight line or a dashed line. The chart recognition program 17 also includes a compound chart recognition program 22 for recognizing compound charts made from a compound line, such as multiple straight lines or dashed lines. Lastly, the chart recognition program 17 includes a symbol recognition program 23 for recognizing a symbol that is connected to a chart or compound chart.

The chart recognition program 17 may also include an isolated symbol recognizing program 24 for recognizing any symbol graphic existing in the drawing. The chart recognition program 17 may also include a text string recognizing program 25 for recognizing any text string existing in the drawing.

Figure 6:
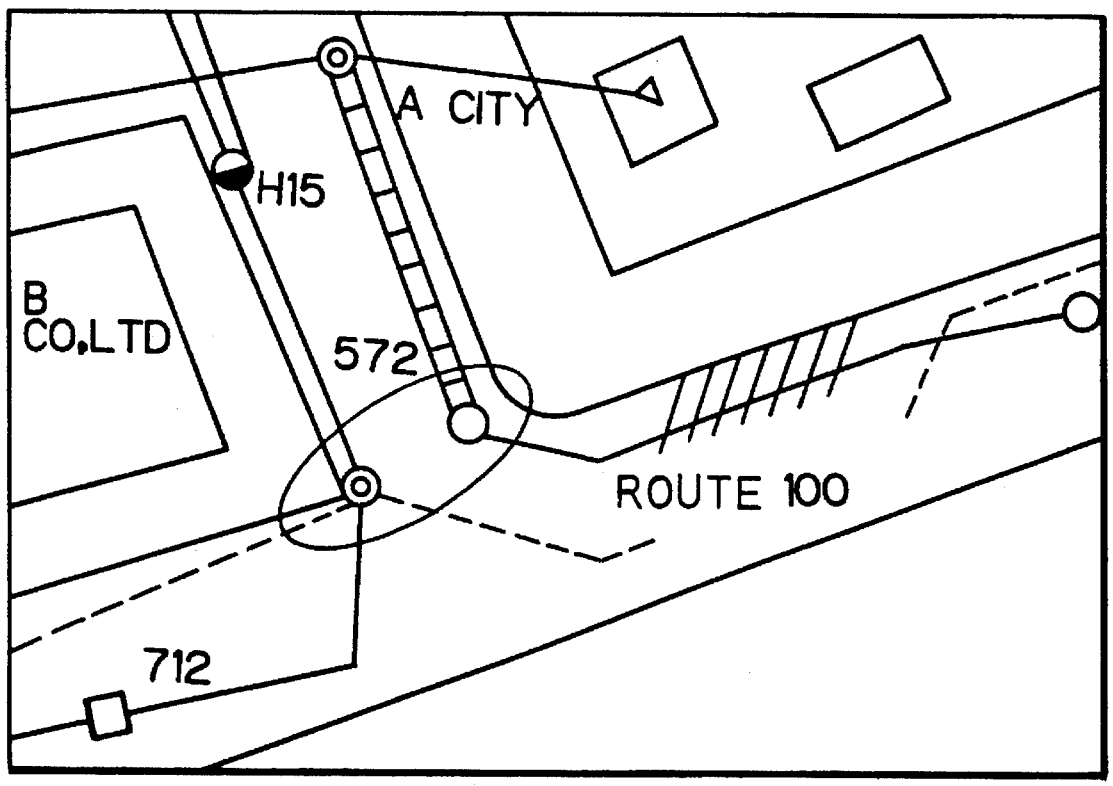
FIG. 6 shows an example of a drawing to be recognized.
Figure 7:
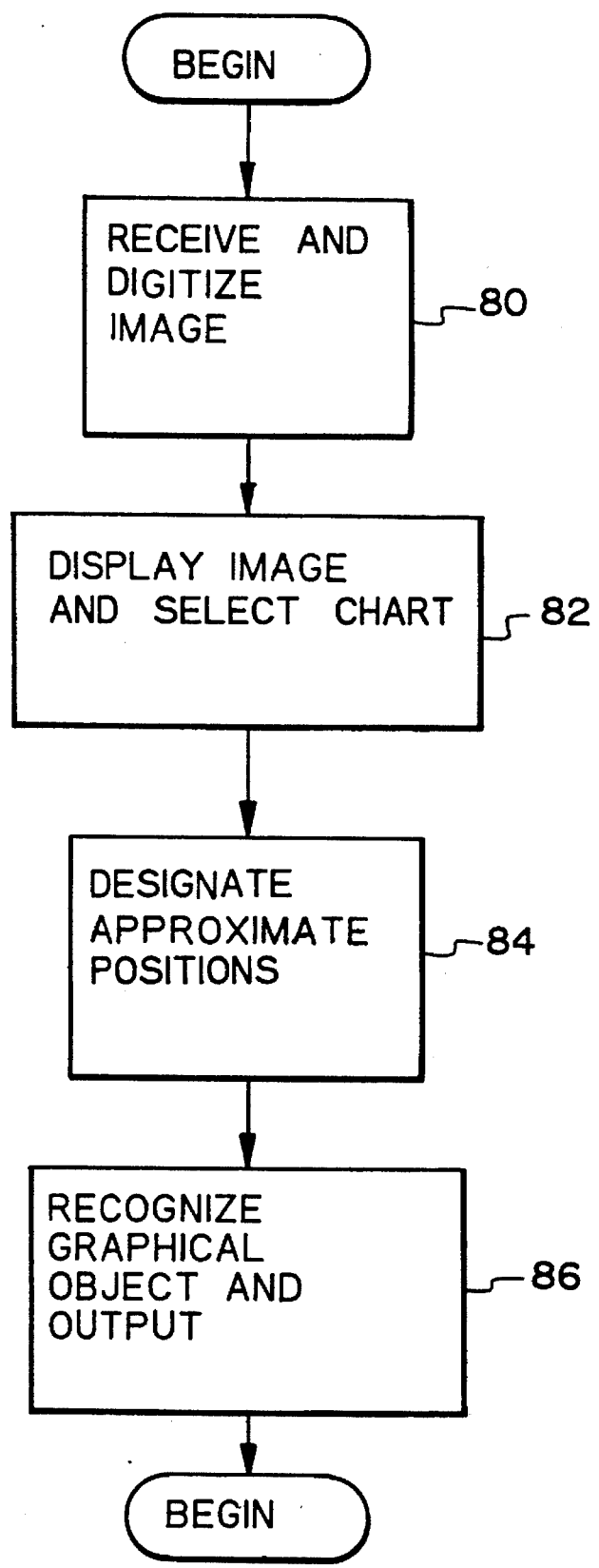
FIG. 7 is a flowchart depicting an overview of the operation of the system in accordance with the embodiment of FIG. 4 of the present invention.

Before discussing the details of the programs employed in the system, it is helpful to briefly review the operation of the system as shown in the flowchart of FIG. 7. The image reader 11 receives a drawing as input and digitizes an image of the drawing (step 80 in FIG. 7) to produce digital image data. A typical image reader providing 300 to 400 dpi resolution for A3–A1 size original drawings is suitable. Digital image data can also be obtained through other means. For example, such data may be stored on an optical or magnetic recording media after having been digitized from another source. An example of a drawing to be digitized, which depicts a portion of a map, is shown in FIG. 6. The image data from the image reader 11 is passed to the data processing system 14 (FIG. 1) and then passed to the display 12, where the image is displayed.

The approximate graphic designation program 13a may, for example, display a list or table of possible graphical objects which can be recognized. A standard menu-like selection may then be made. The input device 13 is used to designate an approximate type of graphical object to be recognized (step 82 in FIG. 7). From this list, for example, the operator may select a "chart" including a "straight line", may select a "compound chart" made from multiple lines, or may select a symbol, or may select a character. When a "chart" is selected, it is also possible to designate whether to approximate charts in detail or to trim the charts instead.

Trimming a chart refers to correction of distorted image data into "true" form. For example, a straight line image entered from original data drawn on paper, particularly when hand-written, may be distorted. The image data can be corrected by changing data in the digitized image data to make a line straight, with constant thickness.

Next, the approximate position designating program 13b operates to allow an operator to enter information concerning the approximate position of a chart to be recognized. An operator uses the input device 13 (FIG. 1) to designate several points on the displayed image representing the chart to be recognized, as approximate positions (step 84 in FIG. 7). If there is a symbol connected to the chart for compound chart, the approximate position of the symbol is also designated. When a symbol or a text string is to be recognized, a single point, indicating the approximate position of the symbol or text string, is designated. When the input device 13 (FIG. 1) is a mouse, the designation is effected by clicking the mouse. Specifically, the mouse is clicked once to designate a turning point of a line and clicked twice to designate a symbol point. In contrast to the prior art, the operator does not need to select a tracking start position Q which is directly on an object in the image. Points need only be placed in the vicinity of the object to be recognized.

Figure 24:
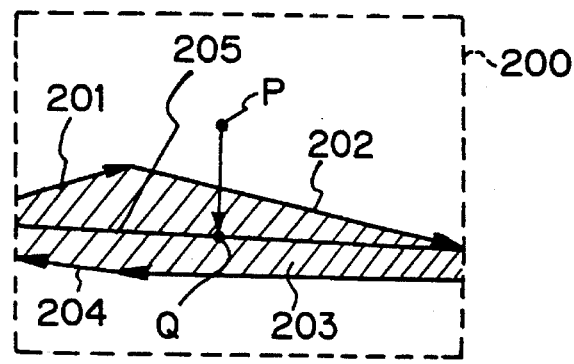
FIG. 24 is a diagram of image data extracted to determine a tracking start position.

In order to find a position Q on an object in the image, given a position P in the vicinity of the object, (referring now to FIG. 24) an area 200, in the vicinity of point P, is cut from the image data. The contour of the image data, designated by arrows 201–204 is used to determine a core line vector 205.

The contour lines 201–204 are determined by edge black pixels which are located adjacent to white pixels. Line segments parallel to the edges of the cut out area 200 between such edge black pixels provide black run length vector data. The midpoints of each of these line segments define the core line vector 205. A line, drawn normal to the core line vector 205, and passing through the designated point P provides a point of intersection which is the desired point Q.

Once the approximate positions have been designated, the drawing recognition program 14 recognizes the designated graphical object, and the drawing plotter 15 outputs the resulting recognized graphical object (step 86 in FIG. 7).

The operation of the drawing recognition program 73 will now be described in more detail. First, the operation of the drawing recognition program 73 will be described for an instance wherein the program is seeking to recognize a simple chart formed with a straight line or a dashed line. The recognition of such a chart is performed by the simple chart recognition program 21, which will be described below in conjunction with the flowchart of FIG. 8.

Figure 9A:
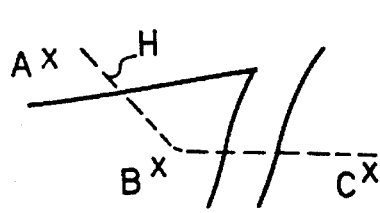
FIGS. 9a and 9b are diagrams illustrating how the approximate positions are designated in a drawing.

Assume that a dashed line "H" shown in FIG. 9a, is to be recognized. The operator designates that a "chart" is to be recognized, using the input device 13 (FIG. 1). Then, points "A" and "C" are designated by the operator in the vicinities of the end points of the dashed line "H" in the drawing, which is displayed on the video display 12 (FIG. 1), and a point "B", is designated by the operator in the vicinity of the turning point of the dashed line "H".

Figure 9B:
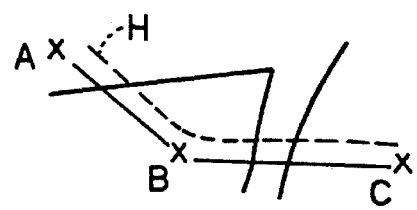
Figure 10A:
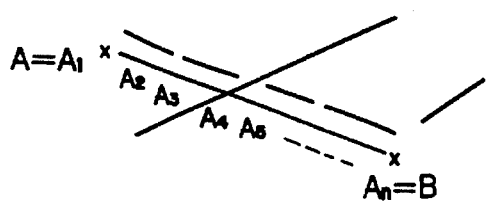
FIGS. 10a–10e depict portions of the drawings of FIGS. 9a and 9b and illustrate how a chart in the drawing is recognized.
Figure 10B:
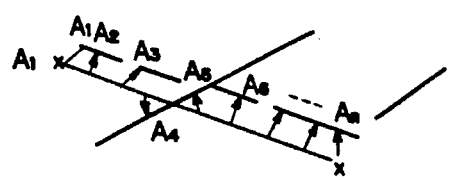

Rough sketch lines (i.e., a chart model) are created (by the chart model creating program 16) on line segments "AB" and "BC", on the basis of the approximate shape of the designated chart, each line segment linking the designated points "A", "B" and "C" (step 31). Then, points are generated along each line segment of the rough sketch, such as line segment "AB", at regular intervals to generate points "$A_1$", "$A_2$", . . . , "$A_n$", where "$A_n$"="B" (see step 32 in FIG. 8) as shown in FIG. 10a, which shows only a portion of the drawing depicted in FIGS. 9a and 9b. The intervals are intended to be constant, though some error exists due to digitization. The size of the interval may be adjusted as needed. Next, as shown in FIG. 10b, each of the respective points on the line segment "AB" which are located closest to corresponding points "$A_1$", "$A_2$", . . . , "$A_n$" are retrieved from the image data of the drawing. Then, the positions of the points "$A_1$", "$A_2$", . . . , "$A_n$" are changed to those of the retrieved points (see step 32 in FIG. 8).

Figure 10C:
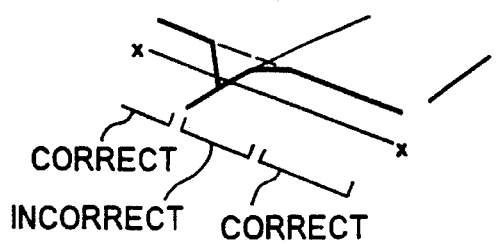

The image data may include information representing the thickness of the line segment. Therefore, the closest points on the line segment are associated with points located inwardly by half the thickness of the line segment. The positions of the points "$A_1$", "$A_2$", . . . , "$A_n$" are changed to those of the inward black points (see step 32). Next, the directions of the line segments formed between the respective points "$A_1$", "$A_2$", . . . , "$A_n$" (e.g., "$A_1A_2$", "$A_2A_3$", etc.) are calculated, based on the locations of the start and end points of the segments in the x-y coordinate system. If a set of line segments are aligned in a direction represented with a certain threshold, as determined by the line thickness and generally 15° to 20°, the set is deemed to be a correct interval. On the other hand, if a set of line segments lies outside of the threshold the line segments are deemed to be an incorrect interval. In FIG. 10c, "$A_1$" to "$A_3$" and between points "$A_6$" to "$A_n$" are deemed to be correct intervals, while the line segments from points "$A_3$" to "$A_6$" are deemed to be an incorrect interval (step 33 in FIG. 8).

Figure 10D:
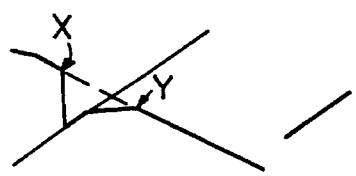
Figure 10E:
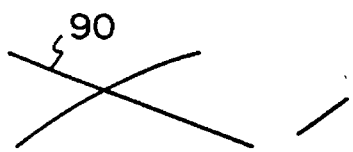

For an incorrect interval, a rough sketch is re-created. For example, the incorrect interval (FIG. 10c) between points "X" and "Y" as shown in FIG. 10d, is re-drawn to create the line 90 (shown in FIG. 10e). Then, the processing of steps 32 and 33 is repeated, using smaller intervals when dividing the line segment, to correctly recognize the resulting line (step 34 in FIG. 8).

Next, the type of converged line on points $A_1$ to $A_n$ is recognized. When the image data of the points $A_1$ to $A_n$ in the drawing are represented as alternating white and black pixel illuminance values, the program recognizes that the line is a dashed line. When the number of black pixels per a specified area of the line exceeds certain threshold, the program recognizes the line as a solid line (step 35 in FIG. 8). This processing is performed for each line of the rough sketch. Then, the type of the chart, and the precise position and shape of the chart specified with the final state of the matched rough sketch are output as resultant code data (step 36). For example, the coordinates of points on the recognized line, approximated by A, B and C, are output, along with an indication that the recognized chart was a dotted line.

Figure 11A:
FIGS. 11a–11c depict a chart, a result of approximating the chart and a result of trimming the chart, respectively.
Figure 11B:
Figure 11C:

The above discussion focuses on operation of the chart recognition program 17 (FIG. 5) when the program recognizes a simple chart such as a straight line or a dashed line. Now consider operation of the program when recognizing a dashed curve like that shown in FIG. 11a. When the image data of a drawing shown in FIG. 11a is to be recognized, a shape like that of FIG. 11b, which is created merely by linking points designated with a mouse, may be encoded or trimmed. Alternatively, a recognized rough sketch like that shown in FIG. 11c may be encoded faithfully to track the original image of FIG. 11a.

Figure 12A:
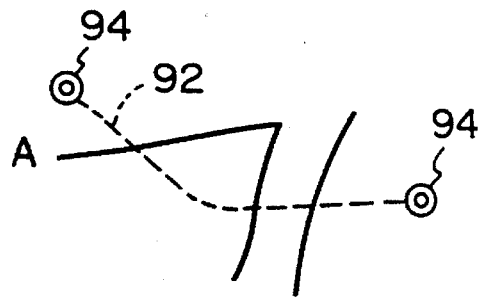
FIGS. 12a and 12b illustrate how a chart with symbols connected is recognized.
Figure 12B:
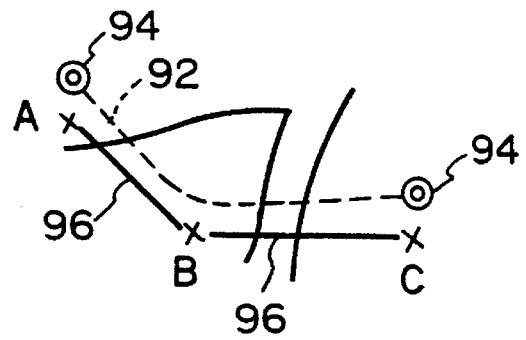

The chart recognition program 17 (FIG. 5) may also be used to recognize graphical objects like the double-circle symbols and the dashed line linking the doubled circles that are shown in FIG. 12a. In this case, the chart (i.e., the dashed line 92) and symbols (i.e., the double circles 94) are recognized as a unit by performing almost the same operations as those performed for a chart. Specifically, an operator designates a "chart" and also designates points "A" and "C" in the vicinities of the double-circle symbols 94. Lastly, the operator designates a point "B" in the vicinity of the turning point of the line 92 (see FIG. 12b) so that the double-circle symbols and the dashed line linking the double circles will be recognized. Then, rough sketch lines 96 are drawn by linking the designated points 37 A" and "B", and "B" and "C" as shown in FIG. 12b. Thereafter, the simple chart recognition program 21 (FIG. 5) is executed to recognize the dashed line as described previously.

Figure 13:
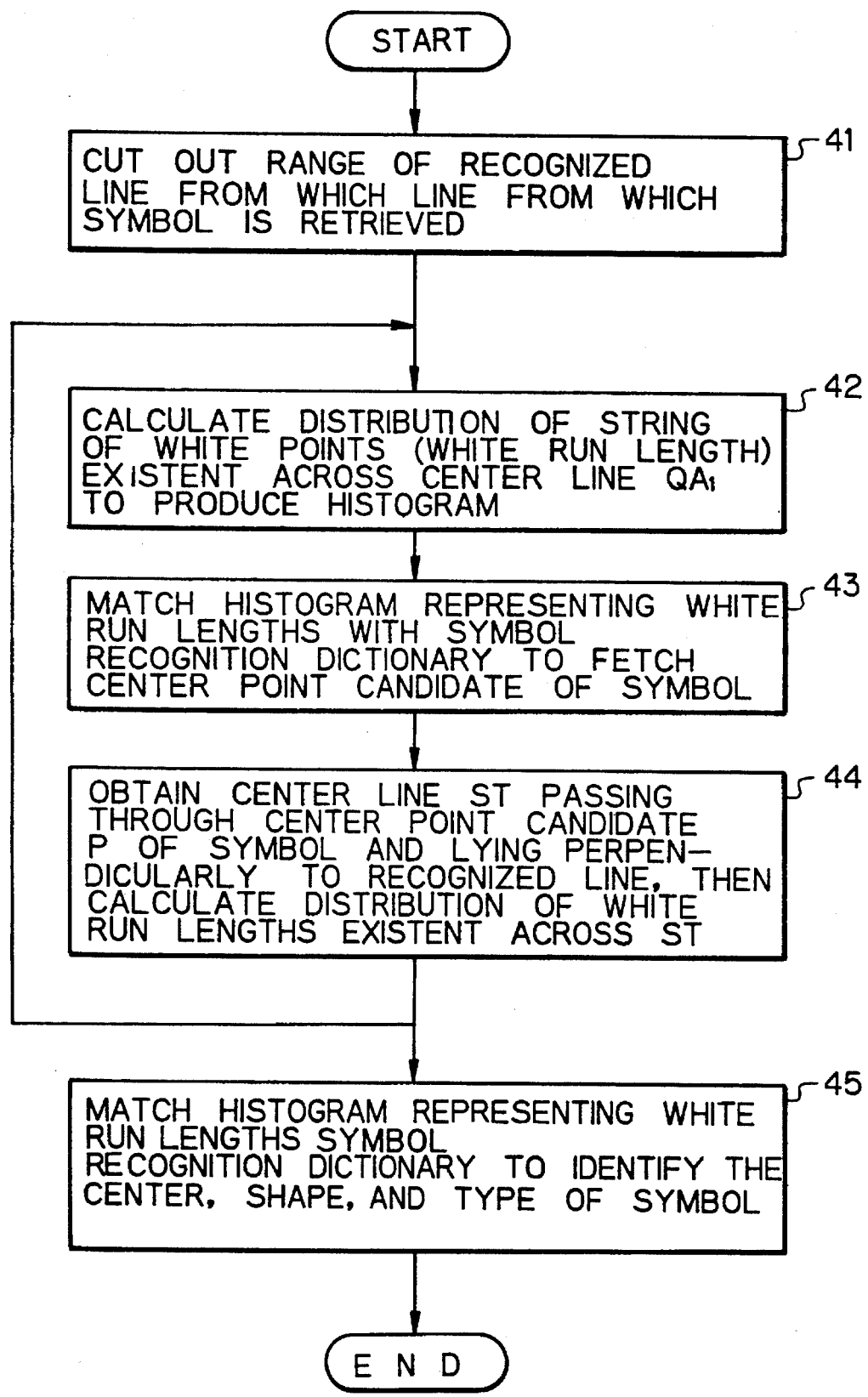
FIG. 13 is a flowchart of the steps performed by the symbol recognition program 23 of FIG. 5.
Figure 14:
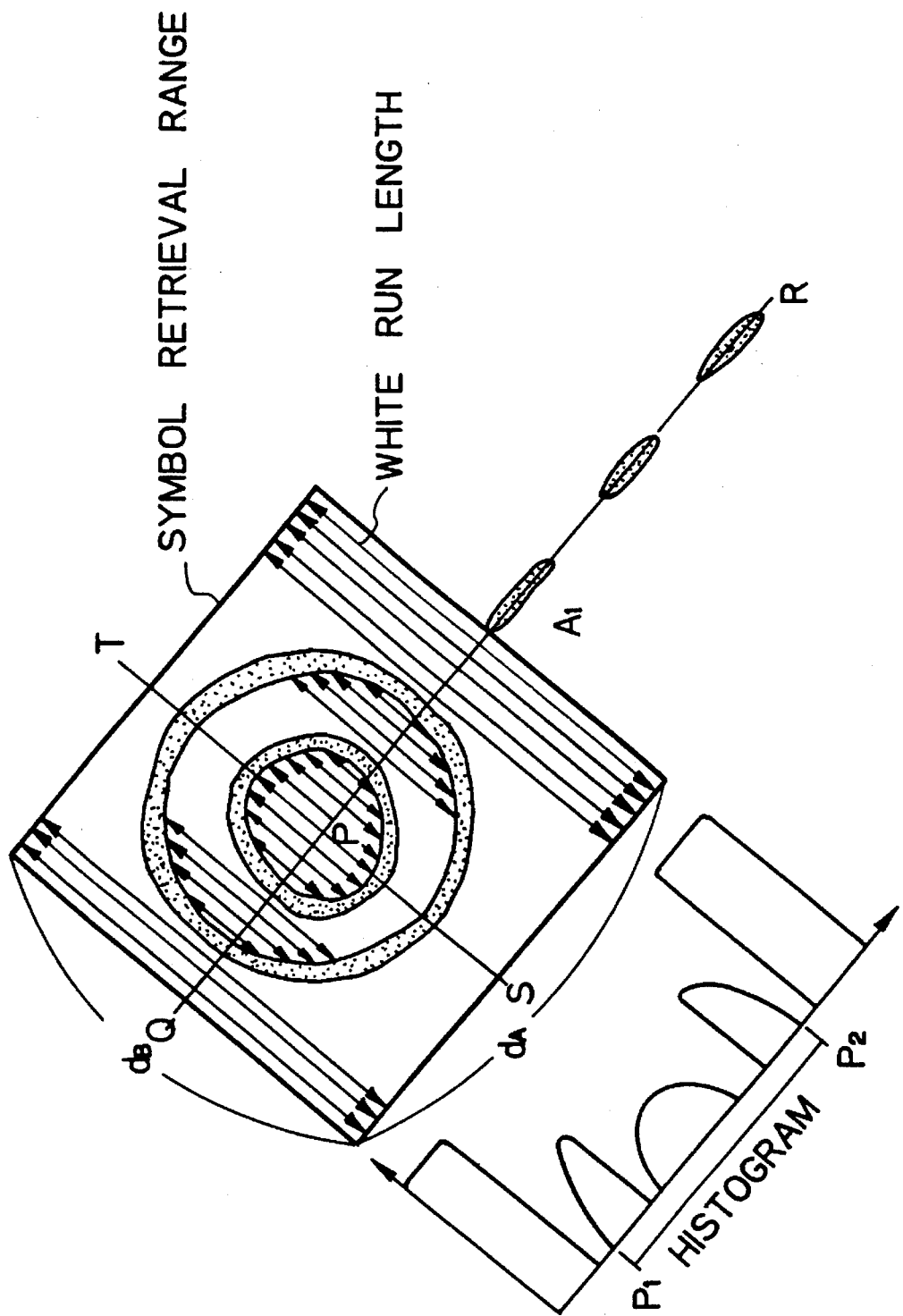
FIG. 14 is a diagram of a double circle symbol and its associated histogram that is useful for explaining operation of the symbol recognition program 23 of FIG. 5.

After the dashed line is recognized, the symbol recognition program 23 (FIG. 5) is executed to recognize the symbols according to the flowchart of FIG. 13. FIG. 14 is an explanatory diagram showing a double-circle symbol like the symbol 94 of FIG. 12b in enlarged scale. Initially, a symbol retrieval range which is "$d_A$" long and "$d_B$" wide (see FIG. 14) is specified beyond an end "$A_1$" of the recognized dashed line, and is cut out from the image data of the drawing (step 41 in FIG. 13). For example, a new image may be made, represented by a grid of pixels $d_B$ wide by $d_A$ long. Next, the length of a string of white points (white run length), relative to a center line "$QA_1$" (Q is the midpoint of $d_B$), is calculated to produce a histogram (see FIG. 14) across the length of $d_A$ (step 42 in FIG. 13). The histogram represents, for each set of points along the length $d_A$ of the cut out image, the amount of white pixels in a line segment normal to the center line QR of the cut out image (white run length).

Then, histograms of known symbols, held in the recognition dictionary 20 (FIG. 4), are matched with the histogram of FIG. 14 to identify the symbol (step 43). During matching, for example, the histogram of FIG. 14 is normalized, and the contents of the recognition dictionary 20 (containing histograms of ideally-drawn symbols) (FIG. 4) are matched with the normalized histogram to fetch matched data exceeding a certain threshold. In this case, the symbol is identified as a double-circle.

The fetched data suggests a center point candidate, denoted as "P" in FIG. 14 (step 43 in FIG. 13). That is, a part of the histogram, segment $P_1P_2$, was determined to match the double-circle histogram. The dictionary data suggests a center point with respect to $P_1P_2$, from which a center point P in the recognized symbol is determined.

A center line "ST" is drawn to pass through "P" (FIG. 14) and to be perpendicular to line segment "$AQ_1$". Then, the white run length along segment ST is then determined (step 44). The histogram for segment ST is also matched to the dictionary, to confirm the type of symbol. The center and type of symbol are thus recognized despite a variation in size or despite a disconnection.

Lastly, the drawing recognition program 73 (FIG. 4) may recognize a compound chart made from multiple lines. The compound chart recognition program 22 (FIG. 5) performs recognition of this compound chart. The operation of this program 22 will be described in conjunction with the flowchart of FIG. 15. Assume that a compound chart made up of multiple lines, as shown in FIG. 16a, is to be recognized. The operator designates that a "compound chart" is to be recognized using the input device 13 (FIG. 1). The operator also designates points "D" and "F" in the vicinities of the end points of the compound chart and designates a point "E", in the vicinity of the turning point of the compound chart.

Figure 15:
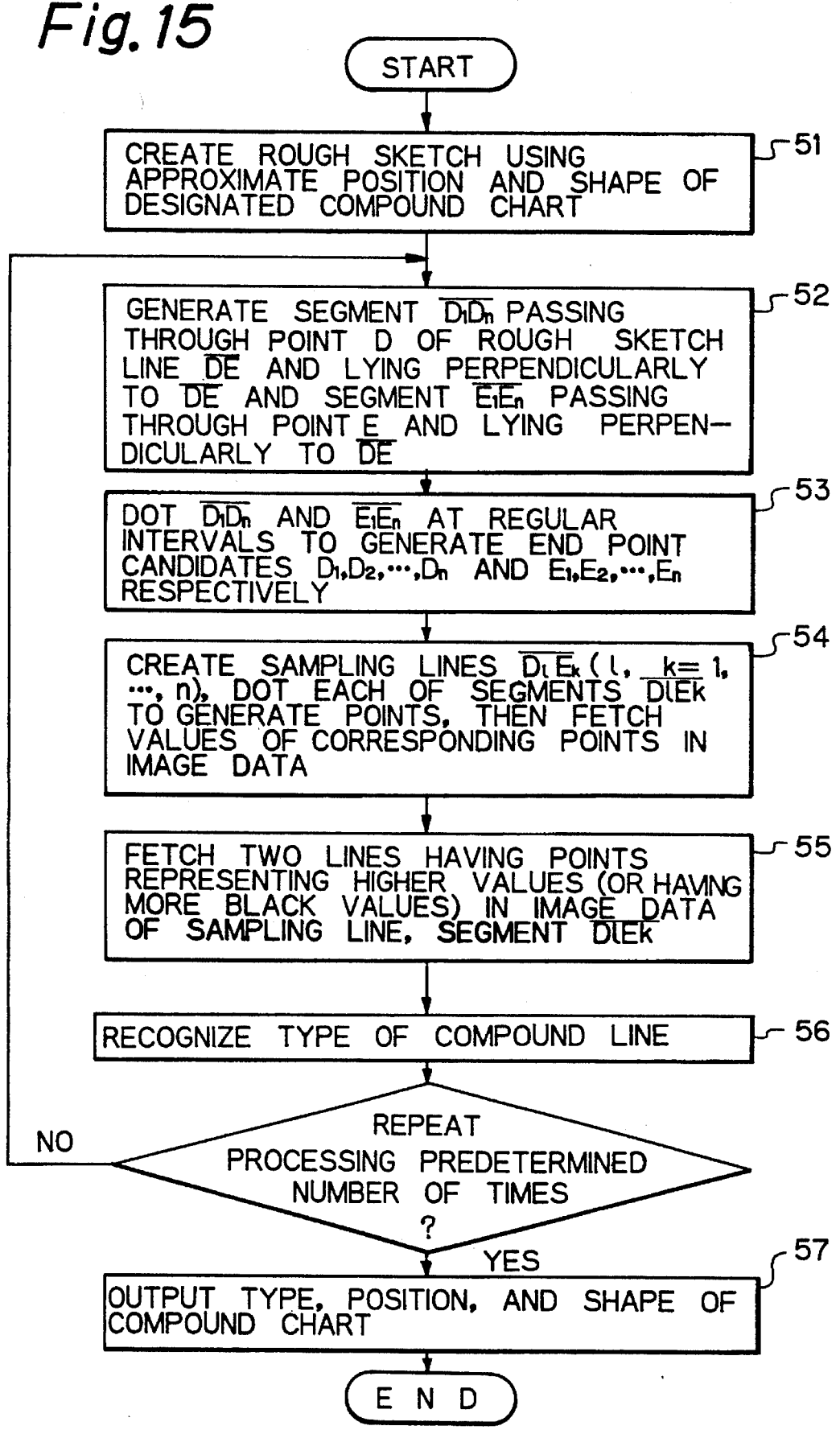
FIG. 15 is a flowchart of the steps performed by the compound chart recognition program 22 of FIG. 5.
Figure 16A:
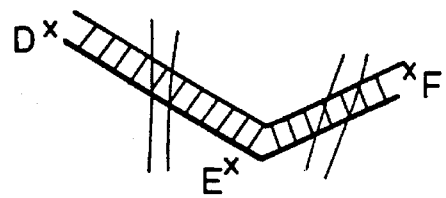
FIGS. 16a and 16b are diagrams showing a compound chart and how the compound chart is designated.
Figure 16B:
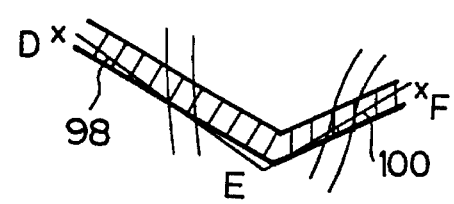
Figure 17A:
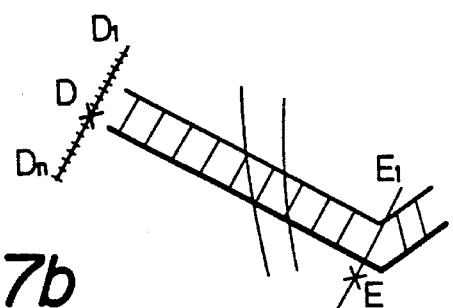
FIGS. 17a–17e are diagrams of the compound chart of FIGS. 16a and 16b which are useful for explaining operations of the compound chart recognition program 22 of FIG. 5.

Then, as shown in FIG. 16b, rough sketch lines 98 and 100 are drawn on line segments "DE" and "EF" (step 51 in FIG. 15). Next, for a rough sketch line, such as the rough sketch line 98 for line segment "DE", a line segment "$D_1D_n$" that passes through point "D" and lies perpendicularly to "DE" and a line segment "$E_1E_n$" that passes through the point "E" and lies perpendicularly to "DE" are generated as shown in FIG. 17a, which shows only the relevant portion of the drawing of FIGS. 16a and 16b. Similar line segments are also generated for the line segment "EF" (step 52 in FIG. 15).

Figure 17B:
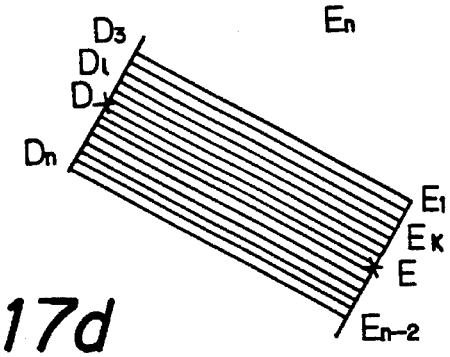
Figure 17C:
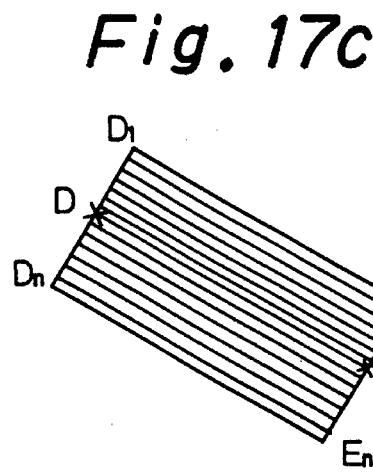

Next, points are designated across line segments "$D_1D_n$" and "$E_1E_n$" (see FIG. 17a) at regular intervals to generate end point candidates "$D_1$", "$D_2$", . . . , "$D_n$" and "$E_1$", "$E_2$", . . . , "$E_n$", (step 53 in FIG. 15), respectively. Next, sampling line segments "$D_lE_k$" linking end points "$D_l$" (l= 1, 2, . . . , n) with end points "$E_k$" (k=1, 2, . . . , n) are generated as shown in FIGS. 17b and 17c. FIG. 17b illustrates the case wherein points "$D_3$"– "$D_n$" are connected with respective points "$E_1$"–"$E_{n-2}$". FIG. 17c, in contrast, illustrates the case wherein points "$D_1$"–"$D_n$" are connected with points Then, as shown in FIG. 12d, sampling points are generated along sampling line segments $D_lE_k$ (l, k=1, 2, . . . , n) at regular intervals. Then, points representing black illuminance values in the image data of the drawing and which correspond to the sampling points are counted (step 54 in FIG. 15). The two parallel line segments having the largest total are fetched from among the sampling line segments of FIGS. 17b and 17c. The sampling line segments "S" that are shown in FIG. 17e are adopted as contour lines. The distance between the adopted two parallel line segments "S" approximates the width of the compound chart (step 55 in FIG. 15).

Figure 17D:
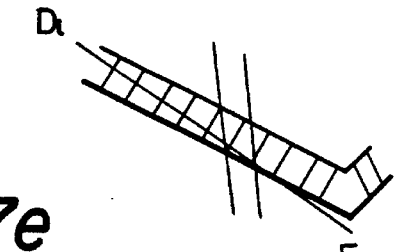
Figure 17E:
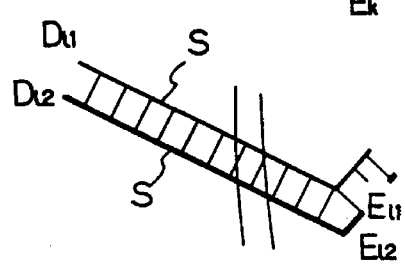

The type of the compound chart is determined according to the state of distribution of black illuminance values inside the fetched contour lines "S" (FIG. 17d). This means that when contour lines "S" and their internal black illuminance values are apparent, the type of compound chart, such as the two lines and compound chart shown in FIG. 16a, can be recognized.

The foregoing processing is performed on each rough-sketch line. Lastly, the type, position, and shape of the compound chart is output (step 57 in FIG. 15).

When a symbol in the drawing is to be recognized, "symbol" is selected by the approximate position designating program, and the coordinate values of the approximate position designated on the drawing is picked up for each symbol by the approximate position designating program.

Figure 19:
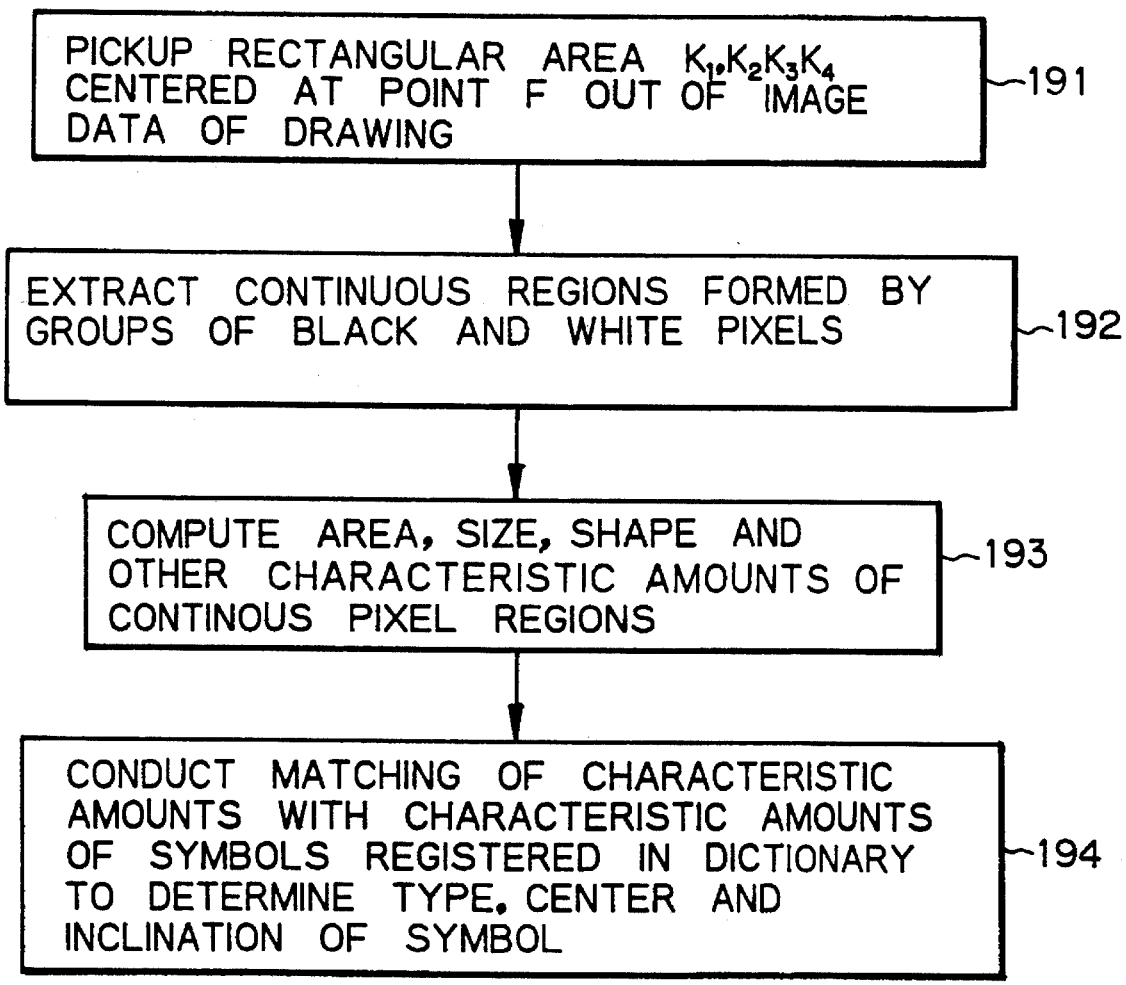
FIG. 19 is a flowchart describing how symbol type and position information is delivered to the chart recognizing program by the chart model creating program.

The chart model creating program delivers the information concerning the type and position of the symbol directly to the chart recognizing program, whereby the symbol is recognized by the isolated symbol recognizing means. This operation will be described with specific reference to a flow chart shown in FIG. 19.

Figure 20A:
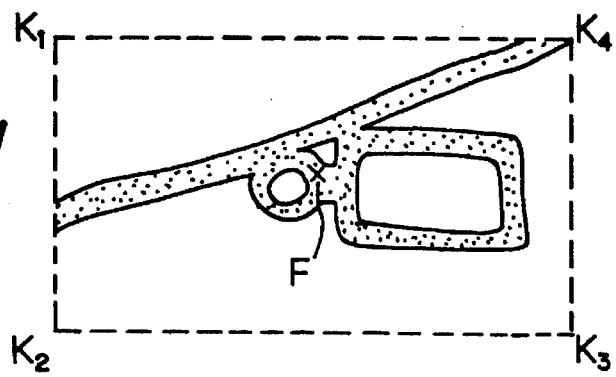
FIGS. 20a and 20b are diagrams showing symbols to be recognized.
Figure 20B:
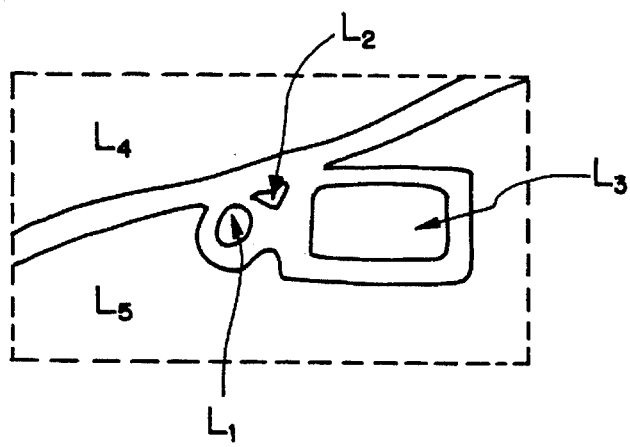

It is assumed that the operator has designated an approximate position F for a symbol as shown in FIG. 20(a). First of all, a rectangular area $k_1$, $k_2$, $k_3$, $k_4$ centered at the point F is taken out of the image data of the original drawing. (Step 191)

Then, labels are attached to continuous regions of black and white pixels inside the rectangular area $k_1$, $k_2$, $k_3$, $k_4$. Regions which spread out of the rectangular area are excluded from the labeling. Thus, in case of the drawing shown in FIG. 15(b), only the regions $L_1$, $L_2$ and $L_3$ are taken out of five continuous white pixel regions $L_1$ to $L_5$. (Step 192)

Subsequently, amounts of geometrical characteristics are computed for each continuous region. For instance, areas, shapes, circumferential lengths and relative positions of the regions are determined. (Step 193)

Then, a matching operation is executed to obtain matching between the determined characteristic amounts and characteristic amounts which have been beforehand registered in a dictionary for each of the symbols, thereby determining the type, center and slope or rotation information of the symbol. (Step 194)

The operator can select, for example, "circle" when he selects the "symbol" in the approximate type selection. Selection of such additional condition restricts the candidate area so as to enable more exact recognition.

When a text string existing in the drawing is to be recognized, the approximate graphic designating program selects "character", and coordinate values of the approximate position designated on the drawing are taken out for each text string by the approximate position designating program. The chart model creating means then delivers the information concerning the type and the position of the text string directly to the chart recognizing program, whereby the text string is recognized by the text string recognizing program on the basis of the above-mentioned information.

Figure 21A:
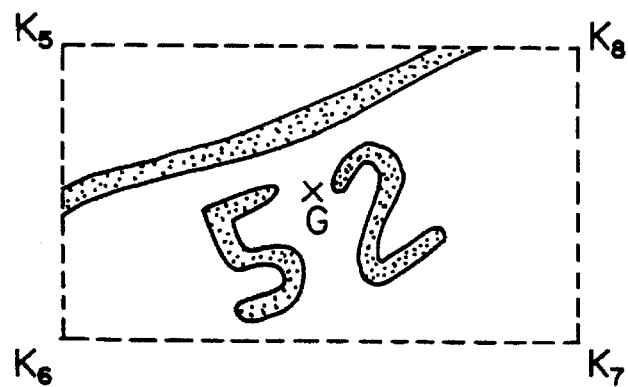
FIGS. 21a and 21b are diagrams showing characters to be recognized.
Figure 21B:
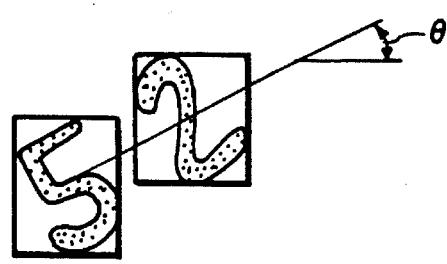
Figure 23A:
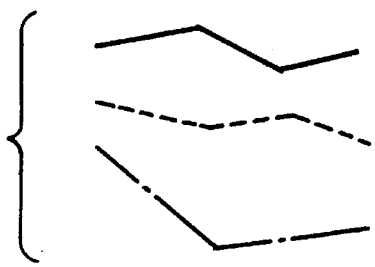
Figure 23B:
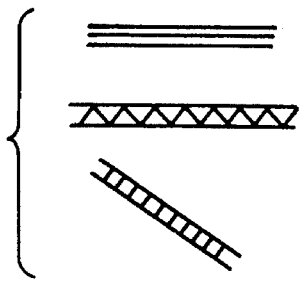
Figure 23C:
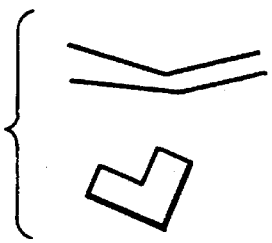

It is assumed that a point G has been designated by the operator for a text string as shown in FIG. 21(a). As in the case of recognition of an isolated symbol, a rectangular area $k_5$, $k_6$, $k_7$, $k_8$ centered at the point G is taken out of the image data of the original drawing. Then, a label is attached to each continuous region of black pixels inside the rectangular area $k_5$, $k_6$, $k_7$, $k_8$, and such continuous pixel regions are extracted. Then, the slope or rotation information of the text string is determined by interconnecting the centers of these continuous pixel regions and the slope or rotation information of image data of each text string is corrected on the basis of the thus determined slope or rotation information. Then, the operator executes entry of data through the keyboard while observing the image. Alternatively, image data may be sent to a conventional character recognition device. It is thus possible to extract the type, size, position and slope or rotation information of the text string.

A recognized chart, symbol or character is presented to the operator by superimposing the results of recognition on image data of the drawing that is displayed on the video display 12 (FIG. 1). This operation is performed by the recognition result display program 18. A deletion range in the image data serving as a sketch, which corresponds to the recognized chart, symbol or character is displayed at the same time on the video display 12. The interactive correction program 19 (in FIG. 4) corrects the results of recognition; that is, the types, positions, and shapes of a chart, symbols and characters to correspond with the designated type. Alternatively, the types of charts or symbols that are well-matched during recognition may be presented to the operator in descending order of match levels to prompt the operator to designate a desired type.

Figure 8B:
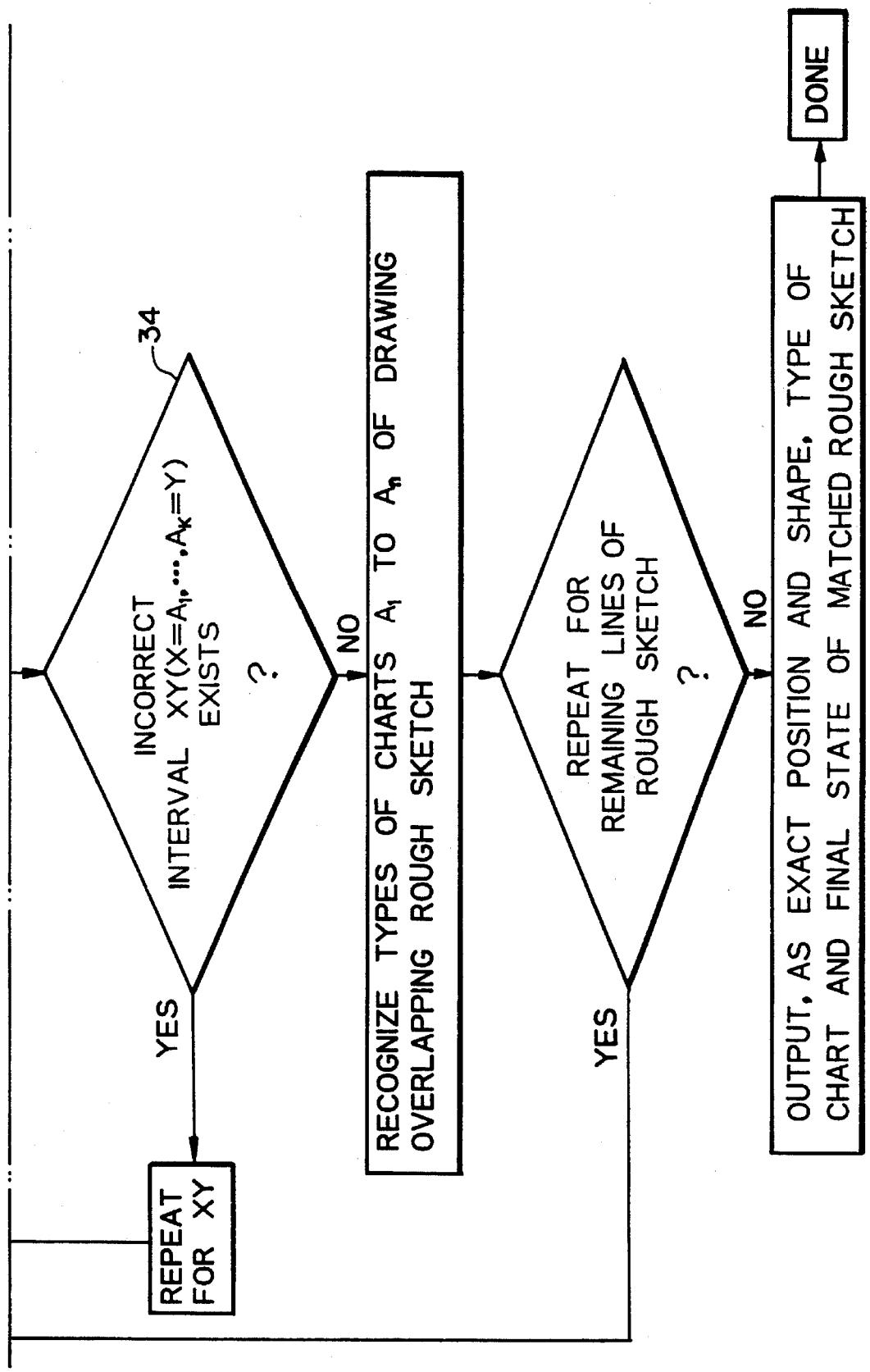
FIG. 8 is a flowchart of the operations performed by the simple chart recognition program 21 of FIG. 5.

When an error in the position or shape of a chart is to be corrected, the error interval may be designated so that the processing beginning at step 32 in FIG. 8 will be performed on the interval. This permits correction with fewer operations than would otherwise be required.

Figure 18A:
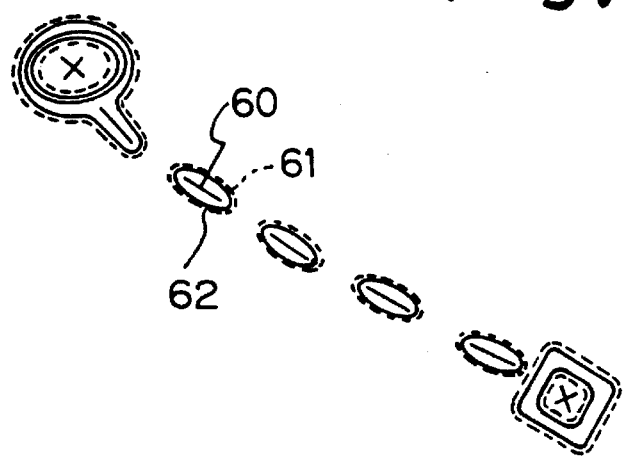
FIGS. 18a and 18b are example drawings that are useful for explaining image deletion in background creation.
Figure 18B:
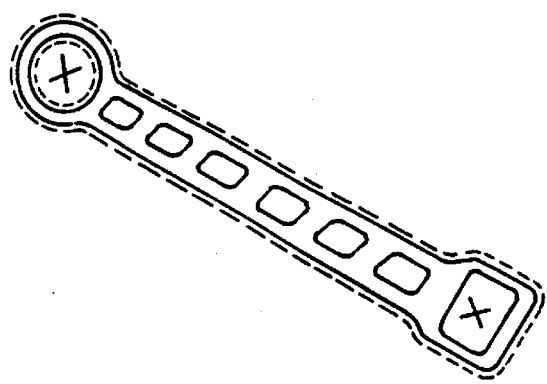

Operations for deleting the image data of a recognized chart from an original drawing to produce a background will now be described in conjunction with FIGS. 18*a* and 18*b*. First, a recognized chart, e.g. chart 63, is converted into image data whose borders are indicated by solid lines in the figure. Then, for each portion (e.g., a line segment 60 having corresponding image data shown by 61) of the chart 63 the portion is enlarged, resulting in image data 62. Image data 62 of the portion is then deleted (logically) from the image data. When a compound chart is to be deleted, a rectangular area 64, including recognized contour lines, is deleted such as shown in FIG. 18*b*. As for each symbol in the drawing, the size, shape, and center position of the symbol are calculated to delete the image data of the symbol from the drawing.

By deleting image data of the recognized chart from the image data of the original drawing, the image data of the background may be obtained. By effecting a line-refining operation on the thus-obtained background data, and effecting also a vector processing which describes all the lines with straight lines, it is possible to compress the data of the background. Consequently, a composite image composed of the recognized data such as the chart and the background superposed thereon can be displayed at a high speed.

Figure 22:
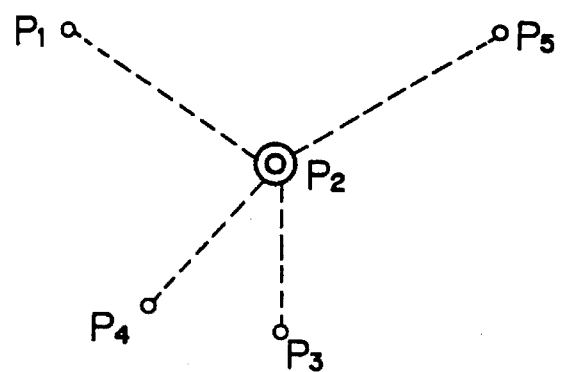
FIG. 22 is a diagram for explaining integration of multiple recognized data values.

The combination of recognized charts, for example which may occur when a chart shown in FIG. 22 is to be recognized, will now be described. Assuming that charts "$P_1$", "$P_2$" and "$P_3$" are first designated by an operator, they are recognized. The result of this recognition is the types of symbols at $P_1$, $P_2$ and $P_3$, their positions in the image (($x_1$, $y_1$), ($x_2$, $y_2$) and ($x_3$, $y_3$), respectively) and the symbols to which they are connected by dotted lines ($P_2$, $P_1$ and $P_3$, and $P_2$, respectively). Second, assume charts "$P_4$", and "$P_2$" and "$P_5$" are designated and then are recognized, although "$P_2$" is not re-recognized. The result of the second recognition is the types of symbols at $P_4$, $P_2$ and $P_5$, their respective locations in the image ($x_4$, $y_4$), ($x_2$, $y_2$) and ($x_5$, $y_5$) and the other symbols to which they are connected ($P_2$, $P_4$ and $P_5$, and $P_2$, respectively). When the second recognition process (i.e., the process of recognizing charts $P_4$, $P_2$ and $P_5$) terminates, the recognized data from the two steps are merged automatically to produce integrated data, on the basis that one designated chart "$P_2$" had already been recognized. The result of the merge is that the recognition result of $P_2$ indicates that it connected to symbols at $P_1$, $P_3$, $P_4$ and $P_5$.

The approximate position designating means described above may also perform the following function, in addition to the function for designating a graphic object to be recognized and obtaining the recognition result. For instance, when there are a plurality of graphic objects to be recognized, the operator designates the approximate positions for these graphic objects so that these approximate positions are stored. Then, the recognition execution instruction is selected so that processes starting from the chart model creating program down to the recognition result display program are executed as a background processing. Then, a correction is effected by an interactive correction program, starting from the object the recognition of which has been completed.

In an alternative method, the computer performs steps from the chart model creating program down to the recognition result display program as a single process, simultaneously with the entry of the approximate positions of the chart, symbols and text strings by the operator. The operator then designate approximate positions of the successive graphic objects on the display, so that the recognition results are displayed successively in accordance with the order of designation.

By employing the described procedure, it is possible to shorten the time for the entry of the graphics on the drawing.

When a drawing is very long or large, it may be divided into multiple portions, each portion being input from the image reader 11 (FIG. 1). In order to recognize charts or symbols on the boundaries of the multiple portions, disconnected lines forming the charts or symbols must be reconnected. In the past, this has been very difficult to achieve. According to the present invention, since symbols or charts are recognized by using image data only, a drawing can be reconstructed merely by merging the image data of divided portions. Therefore, symbols or charts on the boundaries of the divided portions can be recognized by reading out image data extending beyond the boundaries.

The present invention may be used to recognize, for example, equipment drawings. Attributes may be connected provided for the equipment indicated by the drawing, which enables administration of the equipment via a computer program. Maps are also suitable images. Many other types of drawings can be recognized using the present invention.

While the present has been described with reference to a preferred embodiment thereof, those skilled in the art will know of various changes in detail and form that may be made without departing from the spirit and scope of the invention as defined in the appended claims.

What is claimed is:

1. A drawing recognition system for recognizing a graphic in a drawing from a digitized image of the drawing, the digitized image including a graphical image having light areas and dark areas that correspond to light areas and dark areas of the graphic in the drawing, the system comprising:

means for receiving a range of the digitized image including the graphical image;

means for calculating a distribution of the range of the digitized image by establishing a line through the range of the digitized image, and measuring a set of lengths of light area perpendicular to a set of points along the line, the distribution being the set of lengths of light area perpendicular to the set of points along the line; and means for selecting a known distribution from a plurality of known distributions in a database, and calculating a difference between the calculated distribution and the selected known distribution, the graphic being recognized when the difference is below a predetermined threshold.

2. A drawing recognition system for recognizing a graphic in a drawing from a digitized image of the drawing, the digitized image including a graphical image having light areas and dark areas that correspond to light areas and dark areas of the graphic in the drawing, the system comprising:

means for receiving a range of the digitized image including the graphical image;

means for calculating a first distribution of the range of the digitized image by establishing a first line through the range of the digitized image, and measuring a first set of lengths of light area perpendicular to a set of points along the first line, the first distribution being the first set of lengths of light area perpendicular to the set of points along the first line;

means for selecting a known distribution from a plurality of known distributions in a database, and calculating a first difference between the calculated first distribution and a first portion of the selected known distribution, the selected known distribution being considered a candidate distribution when the first difference is below a first predetermined threshold;

means for identifying a center point of the range of the digitized image according to the selected known distribution that is considered to be the candidate distribution, and establishing a second line perpendicular to the first line and through the center point;

means for calculating a second distribution of the range of the digitized image by measuring a second set of lengths of light area perpendicular to a set of points along the second line, the second distribution being the second set of lengths of light area perpendicular to the set of points along the second line; and means for calculating a second difference between the calculated second distribution and a second portion of the selected known distribution that is considered to be the candidate distribution, the graphic being recognized when the second difference is below a second predetermined threshold.

3. The drawing recognition system according to claim 2, wherein the drawing further includes a text string, wherein the digitized image further includes a text string image, and the system further comprises:

means for recognizing a slope of the text string image, the text string image including a plurality of character images, the means for recognizing a slope including means for calculating a center of each of the plurality of character images of the text string image, and means for setting the slope to be equal to a slope of a center line through the centers of each of the plurality of character images.

4. The drawing recognition system according to claim 3, wherein the text string image further includes a plurality of dark areas, and the system further includes:

means for extracting one of the plurality of character image of the text string image according to the dark areas.

5. The system of claim 2, wherein the selected known distribution includes center point data, and the means for identifying a center point includes:

means for retrieving center point data from the selected known distribution; and means for positioning the center point on the first line according to the center point data.

6. A method for recognizing a graphic in a drawing from a digitized image of the drawing, the digitized image including a graphical image having light areas and dark areas that correspond to light areas and dark areas of the graphic in the drawing, the method comprising the steps of:

receiving a range of the digitized image including the graphical image, calculating a distribution of the range of the digitized image by establishing a line through the range of the digitized image, and measuring a set of lengths of light area perpendicular to a set of points along the line, the distribution being the set of lengths of light area perpendicular to the set of points along the line, selecting a known distribution from a plurality of known distributions in a database, and calculating a difference between the calculated distribution and the selected known distribution, the graphic being recognized when the difference is below a predetermined threshold.

7. A method for recognizing a graphic in a drawing from a digitized image of the drawing, the digitized image including a graphical image having light areas and dark areas that correspond to light areas and dark areas of the graphic to be recognized, the method comprising the steps of:

(a) receiving a range of the digitized image including the graphical image, (b) calculating a first distribution of the range of the digitized image by establishing a first line through the range of the digitized image, and measuring a first set of lengths of light area perpendicular to a set of points along the first line, the first distribution being the first set of lengths of light area perpendicular to the set of points along the first line;

(c) selecting a known distribution from a plurality of known distributions in a database, and calculating a first difference between the calculated first distribution and a first portion of the selected known distribution, the selected known distribution being considered a candidate distribution when the first difference is below a first predetermined threshold;

means for identifying a center point of the range of the digitized image according to the selected known distribution that is considered to be the candidate distribution, and establishing a second line perpendicular to the first line and through the center point;

means for calculating a second distribution of the range of the digitized image by measuring a second set of lengths of light area perpendicular to a set of points along the second line, the second distribution being the second set of lengths of light area perpendicular to the set of points along the second line; and means for calculating a second difference between the calculated second distribution and a second portion of the selected known distribution that is considered to be the candidate distribution, the graphic being recognized when the second difference is below a second predetermined threshold.

8. The method of claim 7, wherein the selected known distribution includes center point data, and the step of identifying a center point includes the steps of:

retrieving center point data from the selected known distribution; and positioning the center point on the first line according to the center point data.

9. A drawing recognition system for recognizing a graphic in a drawing from a digitized image of the drawing, the digitized image including a graphical image corresponding to the graphic in the drawing, the system comprising:

means for receiving from a user an approximate attribute of the graphic to be recognized;

means for creating a chart model according to the received approximate attribute; and means for determining whether the created chart model matches the graphical image to a predetermined extent, and automatically shaping a portion of the created chart model according to the graphical image, when the portion of the created chart model does not match the graphical image to said predetermined extent, to reduce deviation from the graphical image, the graphic being recognized when the means for determining and automatically shaping determines that the created chart model matches the graphical image to said predetermined extent.

10. The drawing recognition system according to claim 9, wherein the graphic is a simple chart, wherein the graphical image is a simple chart image, wherein the approximate attribute is a pair of points, wherein the chart model is a line, and wherein the means for determining and automatically shaping includes:

means for dividing the line into a plurality of segments, and matching each of the plurality of segments to the simple chart image;

means for calculating a direction of each of the plurality of matched segments;

means for calculating an average direction from the directions of each of the plurality of matched segments; and means for adjusting the direction of at least one of the plurality of matched segments when the direction of the at least one of the plurality of matched segments differs from the average direction by more than the predetermined extent.

11. The drawing recognition system according to claim 9, wherein the means for receiving includes:

means for selecting a point on the digitized image in a vicinity of the graphical image to identify the graphical image as corresponding to the graphic to be recognized.

12. The drawing recognition system according to claim 9, further comprising:

output means for selectively outputting the created chart model to one of a display device and a storage device.

13. The drawing recognition system according to claim 9, wherein the approximate attribute includes at least one of an approximate type, an approximate position, and an approximate shape of the graphic to be recognized, and wherein the means for receiving includes:

means for modifying the received approximate attribute by changing the at least one of the approximate type, the approximate position, and the approximate shape.

14. A drawing recognition system for recognizing a graphic in a drawing from a digitized image of the drawing, the digitized image including a graphical image having light areas and dark areas that correspond to light areas and dark areas of the graphic in the drawing, the system comprising:

means for receiving from a user a first point and a second point on the digitized image;

means for creating a chart model according to the received first and second points;

means for generating a first segment through the first point and a second segment through the second point, each segment being substantially perpendicular to the created chart model, each segment having a plurality of sample points; and means for forming a plurality of lines, each line being defined by one of the plurality of sample points on the first segment and one of the sample points on the second segment, and selecting at least one of the plurality of lines that most closely matches the graphical image according to the light and dark areas, the graphic being recognized when the at least one of the plurality of lines is selected.

15. The drawing recognition system according to claim 14, wherein the means for forming and selecting includes:

means for selecting two lines; and means for determining a type of the graphic according to a distribution of the light areas and dark areas of the graphical image between the selected two lines.

16. A method for recognizing a graphic in a drawing from a digitized image of the drawing, the digitized image including a graphical image that corresponds to the graphic in the drawing, the method comprising the steps of:

(A) receiving from a user an approximate attribute of the graphic to be recognized;

(B) creating a chart model according to the received approximate attribute; and (C) determining whether the created chart model matches the graphical image to a predetermined extent, and automatically shaping a portion of the created chart model according to the graphical image, when the portion of the created chart model does not match the graphical image to said predetermined extent, to reduce deviation from the graphical image, the graphic being recognized when the step of determining and automatically shaping determines that the created chart model matches the graphical image to said predetermined extent, 17. The method for recognizing a drawing according to claim 16, wherein the graphic is a simple chart, wherein the graphical image is a simple chart image, wherein the approximate attribute is a pair of points, wherein the chart model is a line, and wherein step C includes the steps of:

(a) dividing the line into a plurality of segments, and matching each of the plurality of segments to the simple chart image, (b) calculating a direction of each of the plurality of matched segments, (c) calculating an average direction from the directions of each of the plurality of matched segments, and (d) adjusting the direction of at least one of the plurality of matched segments when the direction of the at least one of the plurality of matched segments differs from the average direction by more than the predetermined extent.

18. The method for recognizing a graphic in a drawing according to claim 17, wherein the step of dividing and matching includes the steps of (i) selecting an interval size, (ii) dividing the line into the plurality of segments, each segment having the selected interval size, (iii) dividing the simple chart image into a plurality of portions, and (iv) associating each of the plurality of segments of the line with one of the plurality of portions.

19. The method for recognizing a graphic in a drawing according to claim 17, wherein the chart model created in step (B) includes a line type, and the method further comprises the step of determining the type to be one of a dashed line and a solid line.

20. The method for recognizing a graphic in a drawing according to claim 16, wherein the drawing further includes a text string, wherein the digitized image further includes a text string image, further including the step of:

recognizing a slope of a text string image, the text string image including a plurality of character images, the step of recognizing a slope including the steps of
calculating a center of each of the plurality of character images of the text string image, and
setting the slope to be equal to a slope of a center line through the centers of each of the plurality of character images.

21. The method for recognizing a graphic according to claim 20, wherein the text string includes a plurality of dark areas, and the method further includes the step of:

extracting one of the plurality of character images of the text string image according to the dark areas.

22. The method for recognizing a graphic in a drawing according to claim 16, wherein the step of receiving occurs simultaneously with the step of determining and automatically shaping, and wherein a user enters the approximate attribute for one graphic while the drawing recognition system recognizes another graphic in response to a recognition execution instruction.

23. The method for recognizing a graphic in a drawing according to claim 16, wherein the step of receiving is repeated at least twice before the step of determining and automatically shaping is performed.

24. The method for recognizing a graphic in a drawing according to claim 16, wherein the step of receiving includes the step of:

selecting a point on the digitized image in a vicinity of the graphical image to identify the graphical image as corresponding to the graphic to be recognized.

25. The method for recognizing a graphic in a drawing according to claim 16, further including the step of selectively outputting the created chart model to one of a display device and a storage device.

26. The method for recognizing a graphic in a drawing according to claim 16, wherein the approximate attribute includes at least one of an approximate type, an approximate position, and an approximate shape of the graphic to be recognized, and wherein the step of receiving includes the step of:

modifying the received approximate attribute by changing the at least one of the approximate type, the approximate position, and the approximate shape.

27. The method for recognizing a graphic according to claim 16, wherein the drawing includes a plurality of graphics, the method further comprising the step of:

repeating the steps of receiving, creating and determining and automatically shaping for each graphic in the drawing.

28. The method for recognizing a graphic in a drawing from a digitized image of the drawing, the digitized image including a graphical image having light areas and dark areas that correspond to light areas and dark areas of the graphic in the drawing, the method comprising the steps of:

(a) receiving from a user a first point and a second point on the digitized image;

(b) creating a chart model according to the received first and second points;

(c) generating a first segment through the first point and a second segment through the second point, each segment being substantially perpendicular to the created chart model, each segment having a plurality of sample points; and (d) forming a plurality of lines, each line being defined by one of the plurality of sample points on the first segment and one of the plurality of sample points on the second segment, and selecting at least one of the plurality of lines that most closely matches the graphical image according to the light and dark areas, the graphic being recognized when the at least one of the plurality of lines is selected.

29. The method for recognizing a graphic in a drawing according to claim 28, wherein the step of generating a plurality of sample lines includes the steps of:

(i) selecting two lines; and (ii) determining a type of the graphic according to a distribution of the light areas and dark areas of the graphical image between the selected two lines.

30. A drawing recognition system for recognizing a plurality of graphics in a drawing from a digitized image of the drawing, the digitized image including a plurality of graphical images, each graphical image corresponding to one of the plurality of graphics in the drawing, the system comprising:

means for receiving from a user an approximate attribute of each graphic to be recognized;

means for creating a chart model of each graphic to be recognized according to the approximate attribute of the graphic; and means for determining whether the created chart model of each graphic matches the corresponding graphical image to a predetermined extent, and automatically shaping at least a portion of the created chart model according to the corresponding graphical image, when the portion of the created chart model does not match the graphical image to said predetermined extent, to reduce deviation from the corresponding graphical image, each graphic being recognized when the means for determining and automatically shaping determines that the created chart model matches the corresponding graphical image to said predetermined extent.

* * * * *